(12) United States Patent
Cheung et al.

(10) Patent No.: US 7,576,454 B2
(45) Date of Patent: Aug. 18, 2009

(54) MULTIPLE MAGNET COIL IN GAP GENERATOR

(75) Inventors: Jeffrey T. Cheung, Thousand Oaks, CA (US); Richard Raymond Tomsic, Redondo Beach, CA (US)

(73) Assignees: CIIIS, LLC, Santa Monica, CA (US); Teledyne Licensing, LLC, Thousand Oaks, CA (US)

( * ) Notice: Subject to any disclaimer, the term of this patent is extended or adjusted under 35 U.S.C. 154(b) by 459 days.

(21) Appl. No.: 11/359,671

(22) Filed: Feb. 21, 2006

(65) Prior Publication Data

US 2007/0052302 A1  Mar. 8, 2007

Related U.S. Application Data

(60) Provisional application No. 60/683,863, filed on May 23, 2005.

(51) Int. Cl.
*H02K 41/00* (2006.01)
(52) U.S. Cl. .............. 310/12; 310/14; 310/30
(58) Field of Classification Search ............ 310/12–15, 310/30, 156.32, 156.25, 268, 156.38
See application file for complete search history.

(56) References Cited

U.S. PATENT DOCUMENTS

| | | | |
|---|---|---|---|
| 6,163,091 A * | 12/2000 | Wasson et al. | .......... 310/12 |
| 6,768,230 B2 | 7/2004 | Cheung et al. | |
| 6,798,090 B2 | 9/2004 | Cheung et al. | |
| 6,809,427 B2 | 10/2004 | Cheung et al. | |
| 6,812,598 B2 | 11/2004 | Cheung et al. | |
| 6,861,772 B2 | 3/2005 | Cheung et al. | |
| 6,911,747 B2 * | 6/2005 | Tsuboi et al. | ........... 310/12 |
| 2005/0200830 A1 * | 9/2005 | Carter et al. | ........... 355/75 |

OTHER PUBLICATIONS

Rong-Jie Wang, et al., Jan. 2005, Optimal Design of a Coreless Stator Axial Flux Permanent-Magnet Generator.

* cited by examiner

*Primary Examiner*—Thanh Lam
(74) *Attorney, Agent, or Firm*—Venable LLP; Stefan J. Kirchanski

(57) ABSTRACT

The present invention is an improved energy harvester or generator based on a yoked magnet array design based on a plurality of magnets arranged into at least two spaced apart linear or circular magnet arrays. The spaced apart magnet arrays are juxtaposed with each magnet in one array attractively interacting with the corresponding magnet in the other array across a small gap. The magnetic flux across the gap is further enhanced by having adjacent magnets in each array having alternate magnetic orientation and by providing a magnetic yoke of magnetically permeable material for the magnet ends of each array that do not face the gap. The gap is provided to allow a conductor in the form of a coil fit between the magnets. Relative motion between the coil and the magnets results in maximal generation of electrical power by the coil.

11 Claims, 28 Drawing Sheets

MULTIPLE MAGNET COIL IN GAP GENERATOR

CROSS-REFERENCE TO PRIOR U.S. APPLICATIONS

The present application claim priority to Provisional U.S. Application 60/683,863 filed May 23, 2005, the content of which is incorporated here by reference.

BACKGROUND OF THE INVENTION

1. Area of the Art

The present application has to do with specialized generators for electric current by moving a conductor relative to a magnetic source.

2. Description of the Related Art

The present inventor has had extensive experience in the art of magnetic transducers with power generation capability. The reader's attention is drawn to U.S. Pat. No. 6,768,230 (27 Jul. 2004), U.S. Pat. No. 6,798,090 (28 Sep. 2004), U.S. Pat. No. 6,809,427 (26 Oct. 2004), U.S. Pat. No. 6,812,598 (2 Nov. 2004), and U.S. Pat. No. 6,861,772 (1 Mar. 2005) which are hereby incorporated herein by reference. In those patents the present inventor disclosed a number of novel magnetic generation systems wherein one or more magnets were moved relative to a stationary conductor (one or more coils of wire) so that the magnetic lines of flux radiating from the magnets intersect the conductor at right angles and induce electromotive forces (i.e., a flow of electrons) therein. An additional aspect of these patents is that the moving magnets can be disposed on an ultra-low friction ferrofluid bearing system. This allows construction of a generation system wherein the magnets move in response to simple motions such as wave motions in a body of water or the motion of a walking person. Thus, it is possible to construct a generator for personal electronic devices such as a cellular telephone that is capable of keeping the cellular telephone battery charged in response to motion of the device's owner.

However, the moving magnet generator may not always produce as much electrical power as desired. The generation of electricity is accomplished by a relative motion of a magnetic source and a conductor (e.g., a coil). In the above referenced inventions this motion is accomplished by moving magnets relative to a stationary conductor. Now the inventor has discovered advantages in configuration made possible by keeping the magnets relatively stationary while moving the conductor relative to them. The resulting configurations are capable of generating more electrical power in real world practical configurations than the earlier devices.

SUMMARY OF THE INVENTION

The present invention is an improved energy harvester or generator based on a yoke magnet array design. The generator is based on a plurality of magnets arranged into at least two spaced apart magnet arrays. The spaced apart magnet arrays are juxtaposed with a magnet in one array attractively interacting with the corresponding magnet in the other array across a small gap. The gap is provided so that a conductor in the form of a coil fit between the magnets. Because the magnets are arranged in an attractive orientation (i.e., south magnetic pole facing north magnetic pole across the gap), the lines of magnetic flux through the coil are essentially normal to the conductor that forms the coil. Relative motion between the coil and the magnets results in maximal generation of electrical power by the coil. The magnetic flux across the gap is further enhanced by having adjacent magnets in each array having alternate magnetic orientation. Thus, if each array contains three magnets so that three magnets are arranged above the gap and three magnets are arranged below the gap and the left most magnet in the upper array is oriented with its south pole facing the gap, the next magnet in the array will have its north pole facing the gap and the third magnet in the array will have its south pole facing the gap. In the case of the lower array the left most magnet will have its north pole facing the gap (and interacting with the north pole of the leftmost magnet in the upper array), the next magnet will have its south pole facing the gap and the third magnet will have its north pole facing the gap.

Additional strength is provided to the magnetic flux across the gap by providing a magnetic yoke of magnetically permeable material for the magnet ends of each array that do not face the gap. Thus all of the magnets in each array interact with each other like one large magnet.

The spaced apart magnet arrays can be either linear or curved (e.g., circular). A linear array or a slightly curved array is ideal for generating electrical energy from repetitive motion such as that caused by a person walking or a boat rocking. In the case of a linear device intended to generate power from walking two linear arrays of spaced apart yoked magnets can exist as a magnet carrier and a coil carrier with one or more coils can be sized to occupy the gap between the magnet arrays. Electrical power is generated in the coil(s) by relative motion between the coils and the magnets. It is important to realize that this relative motion is at right angles to the magnetic axes of the array magnets. Thus, the coil carrier motion relative to the magnets is parallel to the long axis of the magnet arrays. Either the magnet carrier can be fixed in position with the coil carrier making an oscillating motion through the gap, or the coil carrier can be fixed in position with the magnet carrier making an oscillating motion relative to the coil carrier. To ensure a continuing oscillating motion in response to, for example, walking motion, the magnet carrier and the coil carrier should be springingly linked either by a compression spring or an extension spring. This way when the moving component (either magnet or coil carrier) reaches the end of travel, the spring will cause a reverse in direction of the moving component.

Such a linear generator can be used in a cell phone holster where the cell phone makes an electrical connection to the generator when it is inserted into the holster. Most likely the magnet carrier will be linked to the holster and the combination will oscillate up and down in relation to the stationary coil carrier that is attached, for example, to the belt of the holster wearer. It will be appreciated that the combined weight of the magnets and the cell phone will contribute to the up and down oscillation of the holster as the wearer walks thereby charging the cell phone. In cases where the weight of a PDA or other holstered device is greater, it may be advantageous to have the holster, PDA and the coil carrier move relative to a stationary magnet carrier. This choice can readily be made by one of skill in the art on a case by case basis. A similar arrangement can be made where the linear generator exists between the carrying strap of a bag and the body of a bag so that repetitive forces on the strap caused by the swinging of the bag as the owner walks with the strap on his or her shoulder can be translated into electrical power for charging batteries or battery-powered devices in the bag.

The yoked magnet arrays are ideally suited for use with ferrofluid bearings. This creates a very low friction design which is more efficient for generating power from repetitive motions. For optimum use of ferrofluids, the devices should be sealed so that the ferrofluid cannot escape or evaporate.

Such a sealed device can be readily used as a self-charging battery replacement in, for example, a flashlight. The magnet carrier and coil carrier are sequestered inside a cylinder of the size and shape of one or a pair of traditional dry cells. The magnet carrier is equipped with ferrofluid bearing so it readily slides back and forth over a coil carrier that runs the length of the cylinder. Electronic components are provided to combine and store the generated electricity from the coils. The outputs are connected to the top and the bottom of the cylinder so it can be readily inserted in place of an ordinary battery. The "battery" is charged by shaking it back and forth in a direction parallel to the long axis of the cylinder. In response the magnet carrier travels back and forth along the length of the coil carrier with the embedded coils passing rapidly through the gaps between the magnets. Friction can be further reduced and a further focusing of magnetic flux onto the coils can be achieved by providing a drop of ferrofluid on each magnet face within the gap. This causes a meniscus of fluid to form between the magnets and the coil in place of a small air space. An important feature of the spaced apart magnet arrays in the magnet carrier is the ability of this arrangement to work with rebound magnets that conserve kinetic energy when the magnet carrier approaches the end of the coil carrier without resulting in gradual deceleration over an appreciable distance. A rebound magnet is embedded within the coil carrier near the end of the carrier. The rebound magnet is oriented parallel to the magnets of the magnet array but in a magnetic orientation repulsive to the spaced apart magnet pair at the end of the array. As the magnet carrier approaches the end of the coil carrier, the end magnet pair begins to pass over the rebound magnet and repulsive forces force the carrier to change directions. Because the rebound magnet is oriented perpendicular to the direction of magnet carrier travel, it has essentially no effect on the magnet carrier until the rebound magnet is almost between the end array magnets.

It is also possible to have the magnet arrays curved to form a circle. This would be an ideal arrangement for a wheel-based generator as in the wheel of a luggage tote. The coil carrier, which is stationary, can exist as a ring with a series of coils dispersed about the circumference of the ring. The spaced apart yoked magnet arrays are in the form of two ring-shaped yoked arrays spaced apart by connections on their outer circumferences leaving a gap at their inner circumferences to accommodate the coil carrier. A convenient arrangement is for the outer circumference of the magnet carrier to act as the contact surface of a wheel so that the magnets rotate around and over the coils as the wheel turns, thereby generating electrical energy in the coils.

An alternate embodiment of the circular array is adaptable to a low friction ferrofluid design. In this embodiment the circular magnet carrier is constructed as just described but occupies only one segment, say one eighth, of the circle. The magnet carrier is equipped with ferrofluid bearing and is free to move within a sealed disc-shaped container equipped with a horizontally oriented axel equipped with a bearing. Thus the disc-shaped container is rotationally oriented like a bicycle wheel. The coils are internally located as part of the disc-shaped container so that when the container rotates, the coils move through the magnet gap. The magnet array is gravitationally located at the bottom of the rotating container along with a stabilizing magnet to reinforce gravity.

The major goal of the yoked spaced apart magnet array arrangement is to ensure that the coil passing through the magnet gap experiences maximum flux density with parallel flux lines running perpendicular to a diameter of the coil. The flux density and the parallel orientation of the flux lines can be further enhanced by augmenting the magnetic permeability of the coil. This can be achieved by infiltrating the spaces in the coil with nano-ferrite particles. When a coil with enhance magnetic permeability is combined with a ferrofluid meniscus within the magnetic gap, the amount of power generated is significantly increased.

DESCRIPTION OF THE FIGURES

FIG. 6A shows a transparent top view, and FIG. 6B shows a cross sectional view;

DETAILED DESCRIPTION OF THE INVENTION

Figure 1:
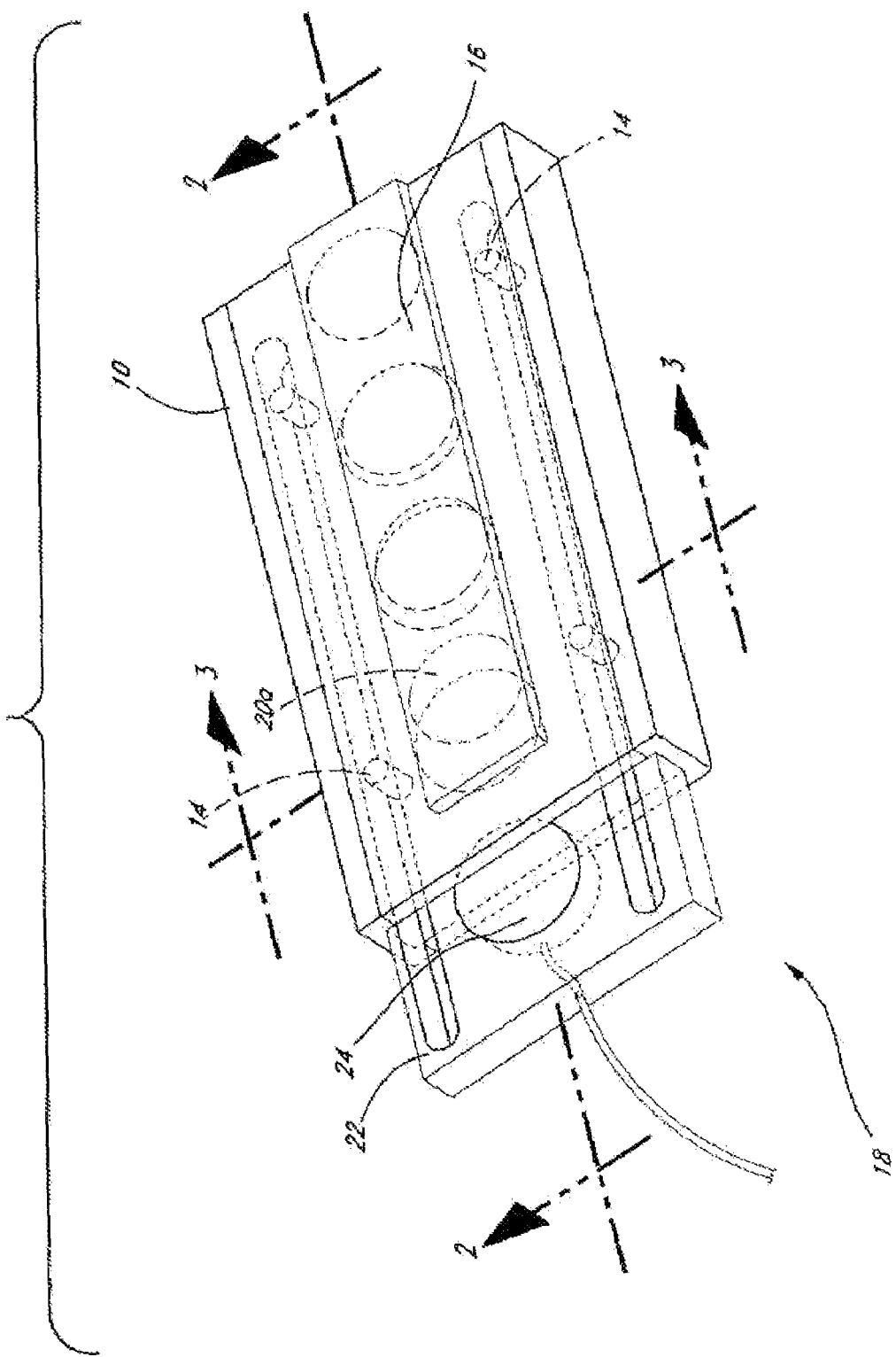
FIG. 1 shows a perspective drawing of an actual prototype of one embodiment of the invention.

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide an improved transducer system for generation of electric current.

The inventor has continued to work on the problem of compact electrical generating systems and has now developed a variety of novel generator configurations wherein an unoptimized prototype is capable of generating better than 70 mW of power in response to reciprocal motion (e.g., a 2 cm motion at 5.5 Hz) of the type that is readily obtainable when a person wearing the generator simply walks. This is significantly more efficient than a moving magnet configuration even where the moving magnet configuration employs significantly more individual magnets. The prototype of one of the embodiments of the present invention is only about 3 inches (8 cm) long by 1.5 inches (4 cm) wide with a thickness of under 0.5 inches (1 cm). Although the size has not yet been optimized, it is already within the range of dimensions to power cellular telephones and personal digital assistants.

In creating the new configurations the inventor realized that a limiting aspect of most magnetic generators is the tendency of the magnetic lines of flux to leave one pole of a magnet and curve sharply around to connect with the opposite pole of that same magnet. Thus, even when the magnet is brought very close to a conductor (e.g., the coil) relatively few lines of magnetic flux actually intersect the conductor at right angles because the lines of flux loop back sharply to the opposite magnetic pole of that same magnet. As a result the number of loops of wire in the coil are must be greatly increased to get maximum generation from intersecting a relatively small number of magnetic lines of flux. One result is large and heavy coils. The new configurations disclosed herein all rely on the same properties: yoked magnet arrays disposed to create a strong magnetic flux across a gap between adjacent arrays. The individual magnets of an array of magnets are joined by a magnetic yoke so that the magnetic cooperation exists between the magnets. In any one array the magnetic polarities of adjacent magnets are alternated to promote this cooperatively. The individual magnets of one array are spaced from a complementary array of magnets (also yoked) whose polarities are selected so that essentially straight magnetic lines of flux cross the narrow gap separating the magnetic poles of the first array of cooperating magnets from the magnetic poles of the second array of cooperating magnets. There are two basic configurations to the arrays: linear and circular. Furthermore, changes in magnetic flux through a conductor result in electric power generation in the conductor, because the flux change can be achieved by relative movement of magnet to the conductor, either the yoked array or the coils can be moved to generate power.

Linear Magnetic Arrays

Figure 2:
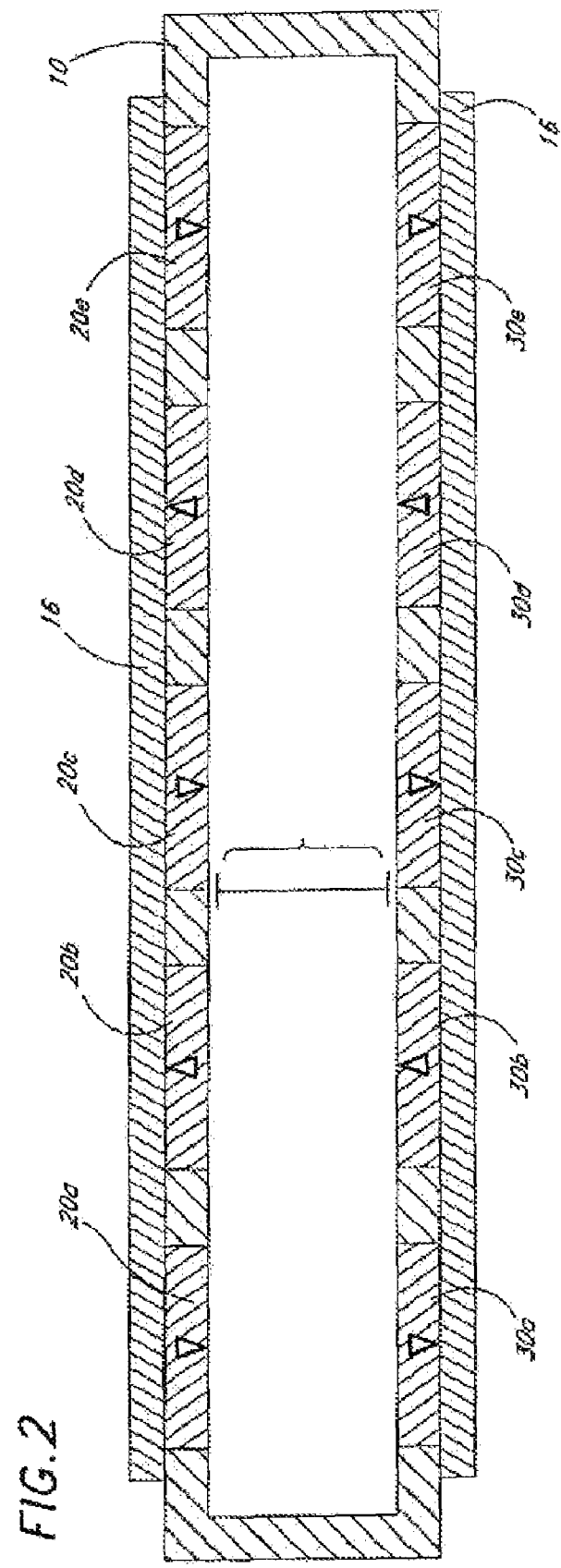
FIG. 2 shows a diagrammatic cross section through a simple linear device of the present invention.

FIG. 2 shows a diagrammatic cross section through a simple device of the present invention having linear magnet arrays. A casing material 10 contains two series or arrays of magnets: the first array 20 (20a, 20b, 20c, 20d, and 20e) is spaced apart from a second array 30 (30a, 30b, 30c, 30d, and 30e). The magnets are NdFeB (neodymium iron boron) magnets of grade 38. Other powerful magnets such as rare earth samarium cobalt magnets are also suitable as will be apparent to one of skill in the art. In this case the magnets are coin shaped with a thickness of about ⅛ inch (about 3 mm); however, magnets of a square or rectangular shape can also be advantageously used. In FIG. 2, a cross-section, the gap 12 between the magnets is shown as being several times thicker than the magnet itself. This is for illustration purposes only; the actual gap 12 in one prototype was 0.26 inches (about 6 mm) which is approximately twice thickness of the magnets. It will be apparent to one of skill in the art that a smaller gap 12 can lead to improved performance, and that magnets of varying thicknesses can be used. There is a practical limit to how small the gap 12 can be made because a conductor (coil) must be moved within the gap 12 past the magnets 20, 30. The coil has a finite thickness so that a practical minimum gap 12 size is probably around the thickness of the current magnets—i.e., ⅛ inch (6 mm). Another practical consideration is that the magnets are arranged with polarities such that the magnets of the first series 20 strongly attract the magnets of the second series 30. The arrows in the diagram point towards the north-seeking pole of the magnet (hereafter north pole or north magnetic pole for simplicity sake). Thus, magnet 20a has its north pole pointing towards the gap 12 and towards the south pole of magnet 30a. Thus, these magnets will strongly attract each other. This attracting orientation is true of all five magnets in each array. The casing 10 must be made of a sufficiently strong material so as not to buckle or bow in response to the attractive forces of the magnets. Since the attractive forces are related to the fourth power of the gap distance, a slightly larger gap can be used to reduce the attractive forces and reduce the tendency for the case to distort. It is desirable to use as light a material as possible for the case such as strong organic polymers (plastic) such as polycarbonate or polysulfone. Alternatively, high strength, lightweight metallic alloys can be used. As discussed below, it is also possible to construct the device with "support pillars" 14 crossing the gap 12 passing through slots 15 in the shuttle 18 to ensure structural rigidity.

Note that not only are the magnets in one array arranged to attract the magnets in the opposing array, each magnet is oriented to have an opposite polarity to the immediately adjacent magnets of its own array—that is the polarities of magnets in an array alternate. The magnets are yoked together by a yoke 16 of mu (μ) metal. Mu metal is a special iron nickel alloy that has extremely high magnetic permeability; one of skill in the art will recognize that other materials (such as Permalloy) of high magnetic permeability can be used to construct the yokes. Normally mu metal is used to provide magnetic shielding. In the illustrated prototype the mu metal yoke 16 is only about 0.06 inches (1.5 mm) thick and yet it absorbs the majority of the magnetic flux. Ideally, this yoke will be configured to effect complete magnetic shielding so that the strong magnet fields of the device will not exist outside of the device. Because of the extremely high permeability of the mu metal yoke, the magnetic lines of flux from one magnet are very efficiently conducted to its neighboring magnets. Because the adjacent magnets are arranged in alternating orientations, the magnetic lines of flux from one magnet are readily absorbed by its neighbors. Therefore, the effect of the mu metal yoke 16 is to combine the magnets of the array into a virtual "super" magnet which then shares lines of flux with its counterpart array across the gap 12.

Figure 3:
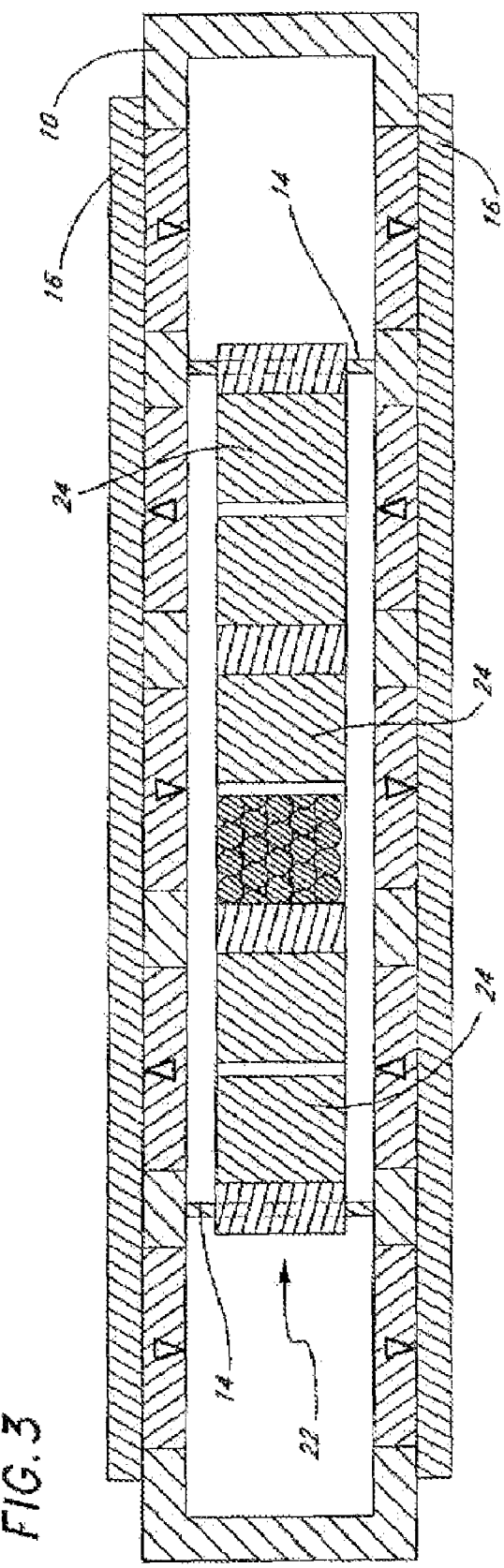
FIG. 3 shows the device of FIG. 1 including a shuttle containing a conductive coil.

FIG. 3 shows the device with a conductor shuttle 18 inserted. The conductor shuttle 18 consists of a carrier sheet 22 into which is inserted one or more conductive coils 24 (24a, 24b and 24c). In the prototype the carrier sheet is about 0.2 inches (about 5 mm) thick leaving a gap of only about 0.03 inches (0.7 mm) at either end of the coil (that is, between the conductor and the faces of the opposing magnet arrays. A single coil prototype configured as shown in the figures and using 38 strength NdFeB magnets was capable of 70 mW peak power generation. The single coil in that device had 330 turns of AWG #38 copper wire. It will be apparent to one of skill in the art that the embodiment shown in FIG. 3 is capable of generating a larger amount of power since it has three coils rather than a single coil. All the coils 24 are constrained by the carrier sheet 22 to move together. Because a given coil will intersect magnetic flux lines of the opposite polarity as compared to the immediately adjacent coil, the direction of current flow in one coil will be opposite the current flow in an adjacent coil. Thus, it is important that the coils be wired in parallel and not series. If wired in series, currents induced in adjacent coils would tend to neutralize each other. With parallel wiring it is possible to swap the leads from adjacent coils to reverse the polarity of the current so that current from all the coils will be added together. Alternatively diodes and other semiconductor devices known to the art can be used to effectively combine the power outputs of a plurality of coils.

FIG. 1 shows a perspective drawing of the device of FIG. 3 partly in phantom so that the relationship of the parts can be understood.

Figure 4:
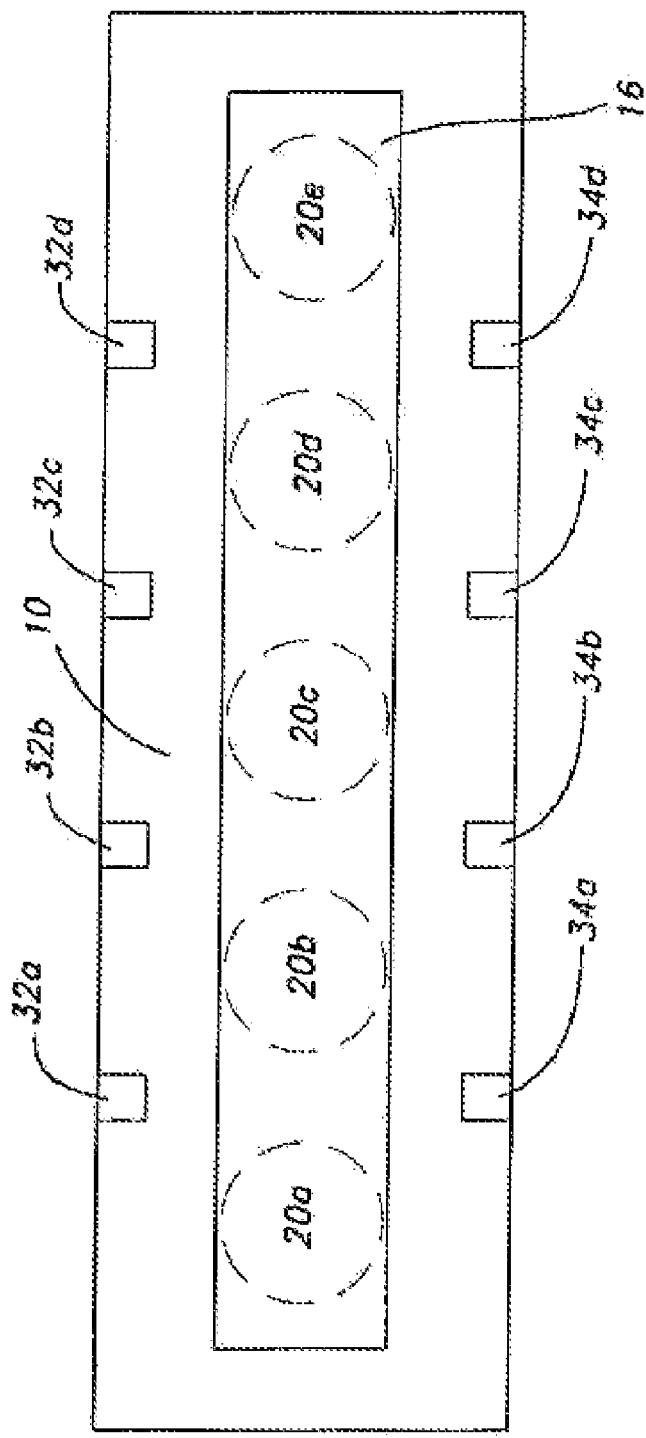
FIG. 4 is a diagram of the upper or lower surface of the device of FIG. 1

FIG. 4 shows the yoke side of an embodiment similar to the device of FIG. 1 except that magnetic bearings are employed to reduce the friction of the movement of the yoked magnets relative to the carrier 22. The magnets 20a-e are indicated in phantom to show their position beneath the yoke 16. Note the additional spaced apart magnets 32a-d and 34-a-d which are provided as magnetic bearings as will be explained below in relationship to FIG. 5.

Figure 5:
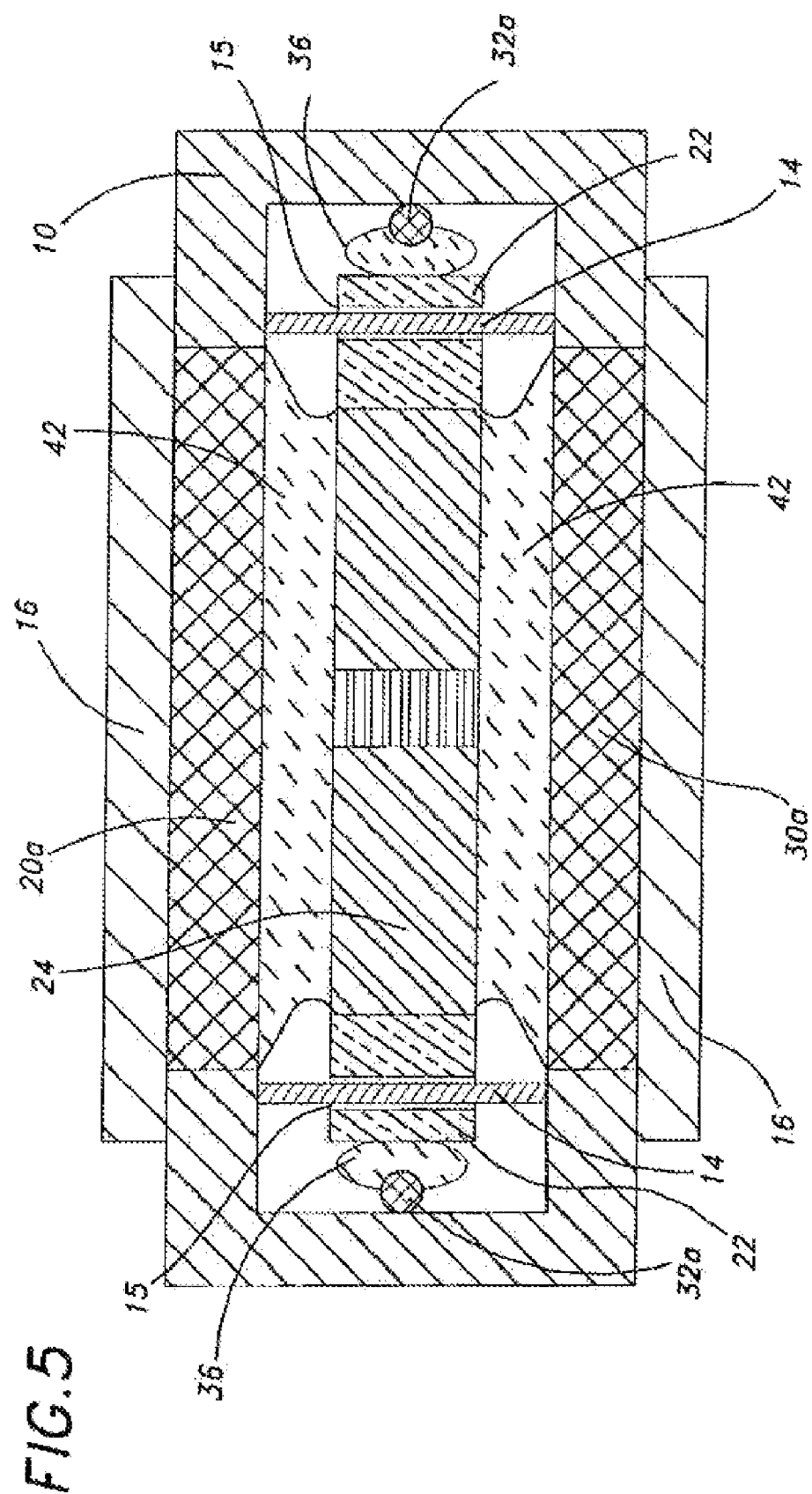
FIG. 5 shows a diagrammatic cross-section through an embodiment illustrating the use of ferrofluid bearings.

FIG. 5 is a diagrammatic cross-sectional view of the carrier 22 and coil 24 in the gap 12 to illustrate possible solutions to the frictional problems of the device. From this view it will be apparent that spaced apart magnets 32 and 34 are aligned with the narrow edges of the carrier 22. Small drops 36 of ferrofluid placed on each of the magnets 32 and 34 allow the carrier 22 to move relative to the magnet carrier 10 in an essentially friction-free manner. Use of ferrofluid is well known in the art and especially favorable compositions of ferrofluid have been disclosed by the present inventor (see U.S. Pat. Nos. 6,768, 230; 6,809,427; and 6,812,583; the content of these patents is incorporated herein by reference). It is possible to machine a groove (not shown) in the edges of the carrier 22 so that the carrier 22 can ride on slightly protruding magnets 32, 34 thus maintaining the alignment of carrier 22 and coils 24 relative to the gap between the magnets 20a, 30a. Additionally, it is possible to provide each of the main magnets 20 and 30 with ferrofluid 42 which forms a meniscus at the magnet carrier interface. This eliminates any possible friction if the carrier 22 becomes misaligned with the gap 12. In addition the meniscus 42 acts as a lens and further focuses the magnetic lines of flux on the coil 24. It is also possible to provide longitudinal (in the direction of coil movement, here in and out of the surface of the paper) slots 15 in the carrier 22 through which reinforcing pillars 14 pass to endure that casing material does not distort because of the magnetic forces.

Figure 6:
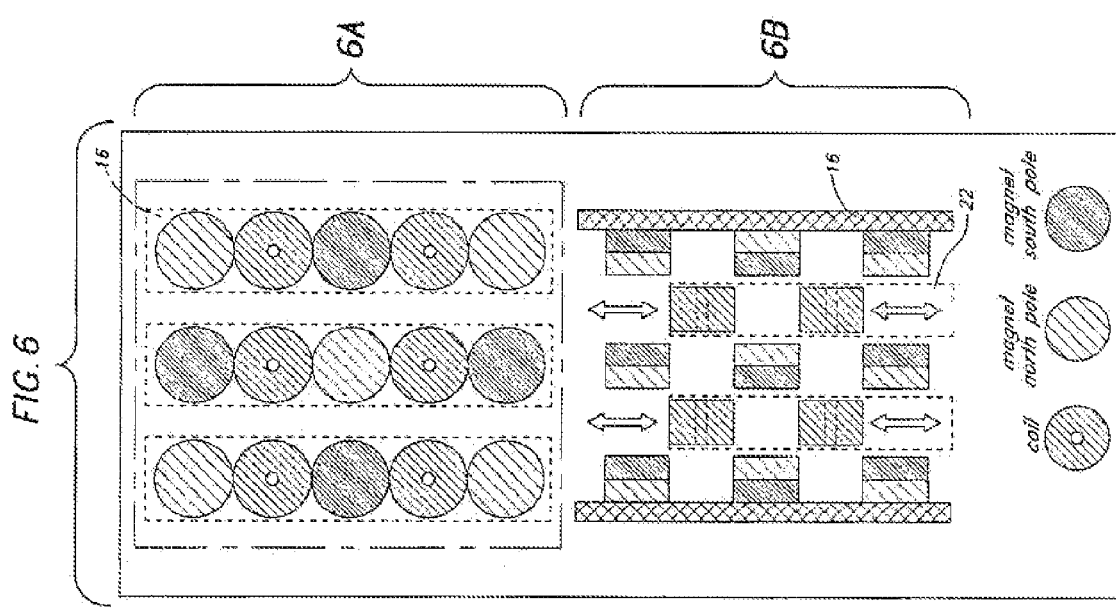
FIGS. 6A and 6B show an embodiment having multiple arrays of magnets and multiple carriers with coils.

It is also possible to have several magnet arrays side by side as indicated in FIG. 6. The top view (FIG. 6A) shows three linear arrays along the x-axis with the magnets of each array arranged along the y-axis. The yoke is shown in phantom, and two coils are shown spaced between the magnets (the carrier 22 in which the coils are embedded is not shown). Note that magnet arrays in the "middle" array of the side view (FIG. 6B) do not have yokes because both poles of each magnet interact with magnets in adjacent arrays. In this configuration it is also possible to have one master mu metal yoke for each "middle" array if each magnet position of such an array is actually a double magnet with the yoke sandwiched between the two magnets at each position. Of course, it is required that the polarities of adjacent rows alternate so that each magnet will be surrounded by magnets having a polarity that encourages sharing of magnetic flux lines through the yoke. This creates a wider device (measured along the z-axis of FIG. 6A) but allows for a greater magnetic flux which translates into increased power generation. Each carrier 22 is shown having two rows of coils (each row arranged along the z-axis in FIG. 6B) with each row interacting with a pair of magnet arrays). Depending on how much travel the carrier 22 is to have, additional rows of coils can be added so that the power output of the device can be greatly increased. It is contemplated that all of the carriers 22 (two shown in the drawing) are linked mechanically so as to move together. This simplifies wiring alternate coils together in series or parallel because the current generated in alternate coils will be in phase. Alternatively, it is possible to have each carrier 22 move separately which would necessitate different electronics to combine the currents of the various coils. The device can also have ferrofluid bearings for each of the multiple carriers as shown for a single carrier in FIG. 5.

Experimental Results

A prototype having the basic structure of the device of FIG. 1 was constructed. The device contained two magnet arrays with a gap of 0.66 cm between the opposing arrays. Each array was formed from four NdFeB (Grade 38) magnets, each a square of 1.9 cm on each side with a thickness of 0.32 cm. Each array was backed by a Permalloy (nickel cobalt alloy) yoke. The opposing magnets (of separate arrays) had the same magnetic orientation while the adjacent magnets (in the same array) had opposite orientations as explained above. The center-to-center spacing between adjacent magnets was 2.1 cm. The carrier contained two coils each 2.54 cm in diameter and 0.5 cm in thickness. Each coil contained 1200 turns of AWG #35 wire and had a resistance of 49 ohms. The center to center distance between the coils was 4.2 cm which is just twice the center to center spacing of the four magnets.

Current was generated by moving the carrier back and forth in the gap. The output terminals of each coil were connected to a load resistor, and the voltage across this resistor was measured during each movement of the carrier. The average power was calculated using the following formula:

$$<P> = \frac{1000 \int_{t_1}^{t_2} V^2 dt}{R_{Load}(t_2 - t_1)}$$

Where V is the voltage in volts; $R_{load}$ is the load resistance in Ohms; $t_1$ and $t_2$ define the time interval of the measurements; and <P> is the average power in mW. In the set of measurements the power output of the coils was connected to an impedance matching resistive load. When the measurements were made with only a single coil connected at one time, the first coil produced an average power output of 37 Mw and the second coil produced an average power output of 33 mW. When the measurements were repeated with both coils connected (but only one coil measured at a time), the first coil produced an output of 37 mW and the second coil produced an output of 33 mW. These results indicate that the interaction between the coils is insignificant.

Figure 7:
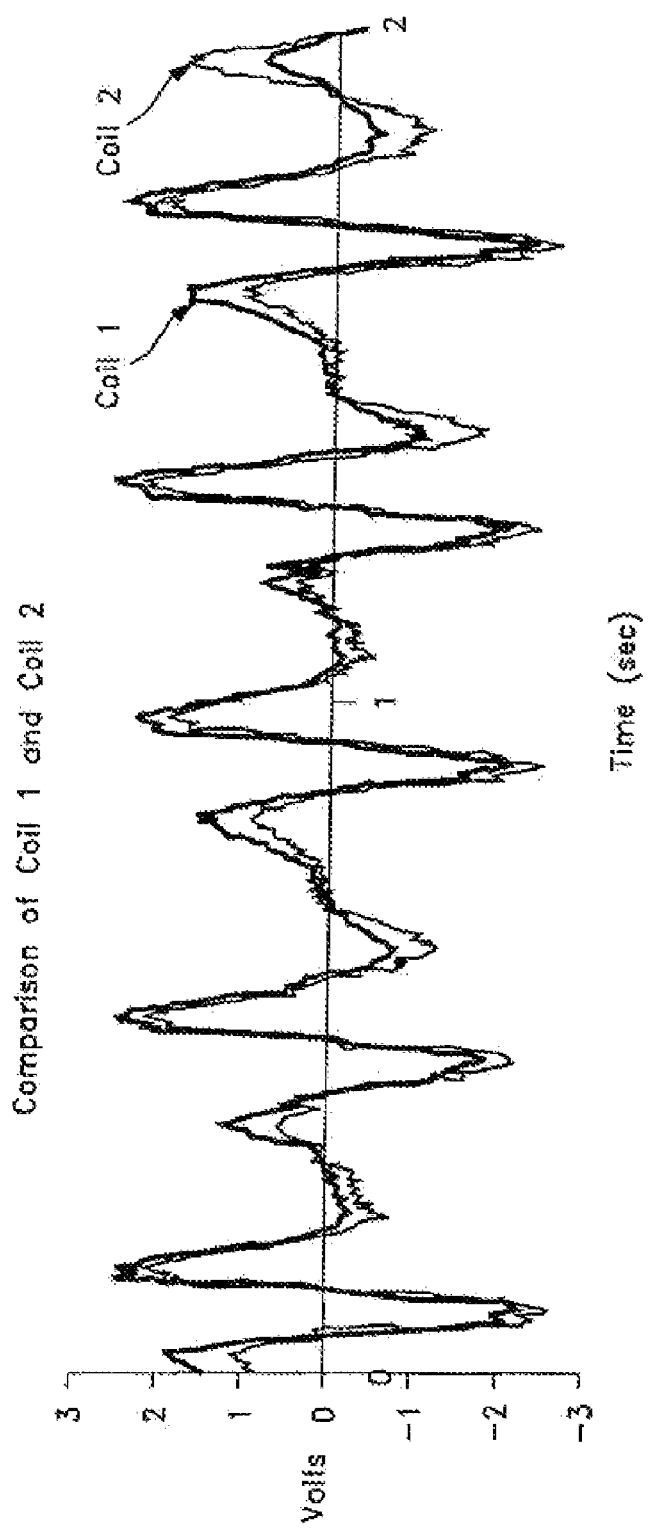
FIG. 7 shows that the outputs of two coils in an experimental device are almost exactly in phase.
Figure 8:
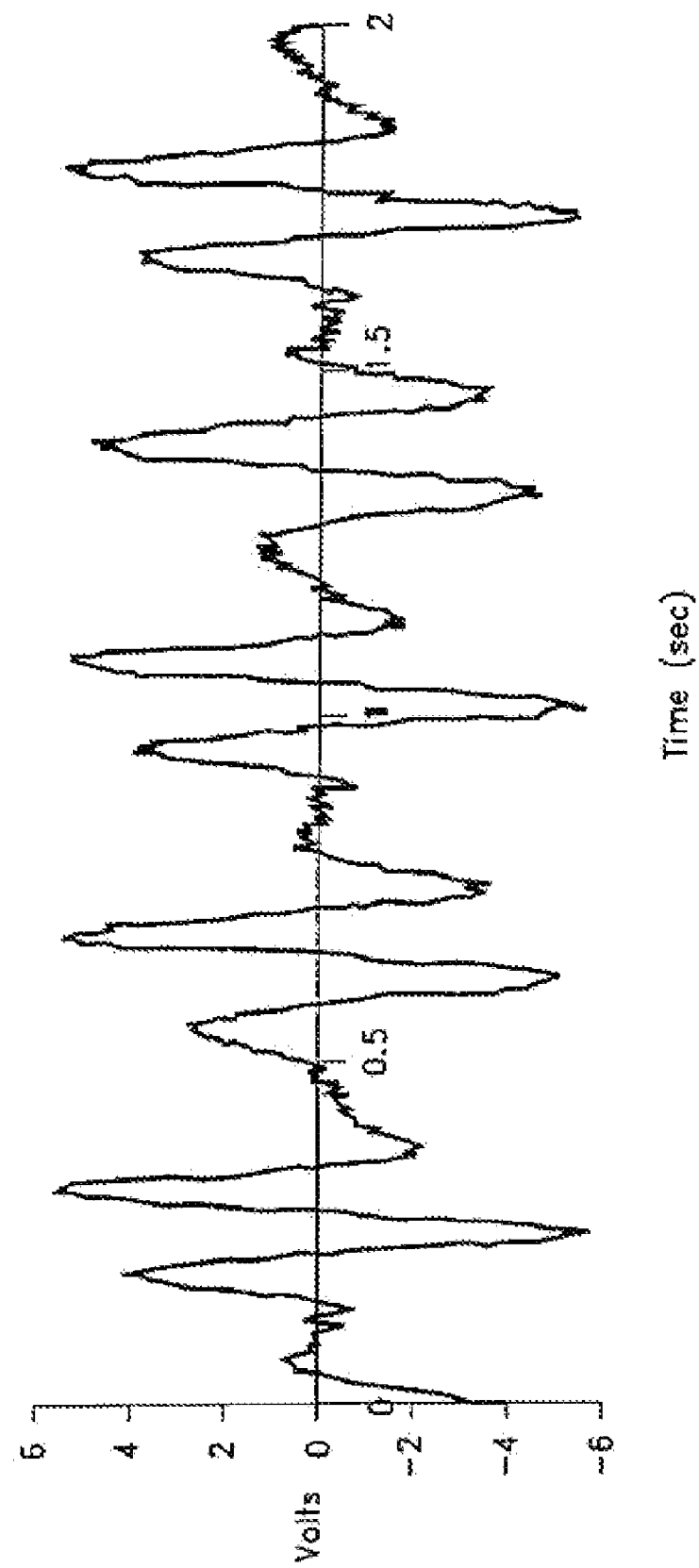
FIG. 8 shows the power generated by an experimental device wit two coils connected in series.
Figure 9:
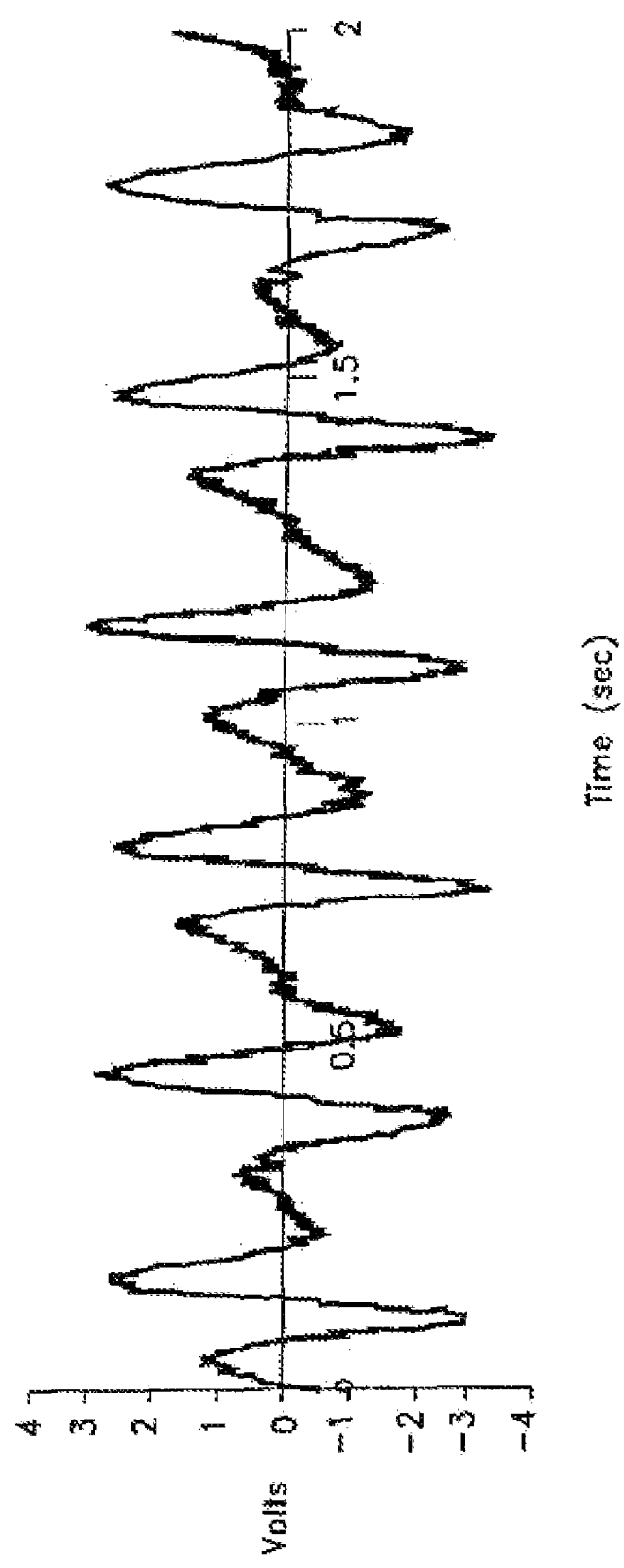
FIG. 9 shows the total power measurement for an experimental device.

The spacing between the coils matches the positions of the magnets in the arrays. Therefore, the outputs of the two coils are in phase FIG. 7 shows that the coil outputs are almost exactly in phase. The output leads from the two coils were then connected in series using a load twice that used for a single coil. These results are shown in FIG. 8; the total measured power was 83 mW. It is also possible to connect the coils in parallel using a load half that used for a single coil. These results are shown FIG. 9; the total measured power for this configuration was 78 mW.

Linear Generators

The present invention is ideally suited for charging a cell phone, PDA or similar unit. The inventive device can readily be included in a holster that hangs from a user's belt, for example, or as part of the connection between a carrying strap and a case containing an electronic device. In such embodiments the magnet arrays and carrier are oriented to move in a vertical (i.e., up and down) direction. A spring function is provided so that the coil carrier 22 and the magnet array 10 oscillate up and down relative to each other in response to normal motions such as those involved in carrying the device. In providing this relative motion either the carrier can move past a stationary magnet array or a magnet array can move relative to a stationary carrier. The spring function can be provided by an actual spring or by magnets repulsively arranged to prevent the magnet array 10 from contacting either the top or the bottom of the carrier 22.

Figure 10:
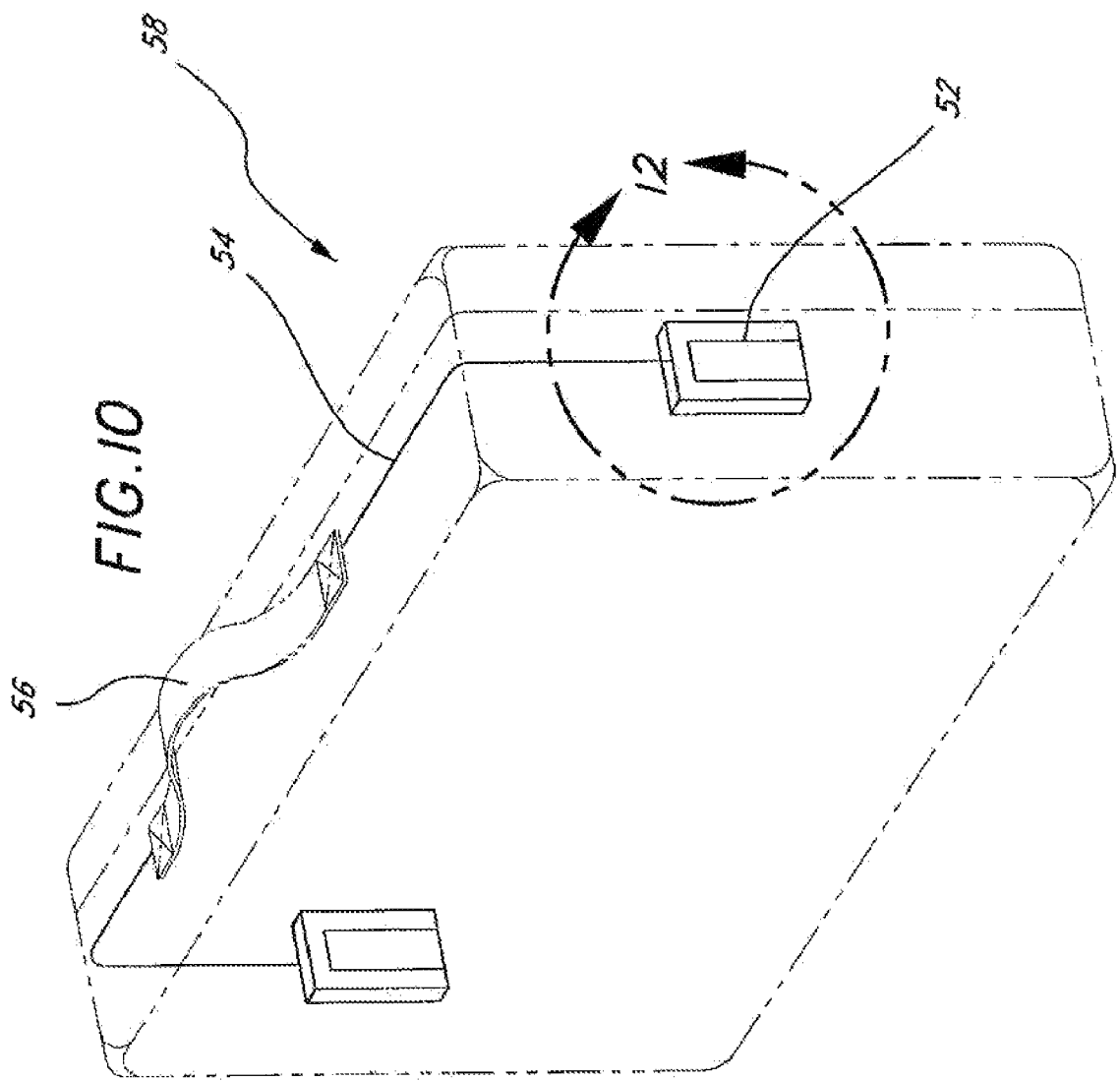
FIG. 10 shows a diagrammatic view of linear generators used with a briefcase.
Figure 11:
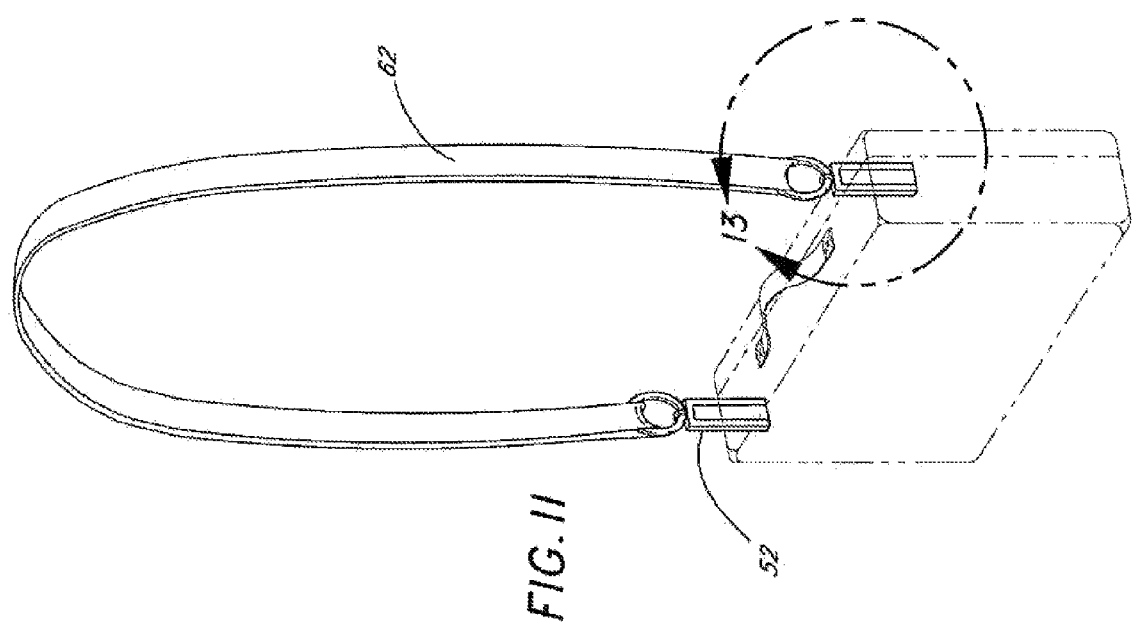
FIG. 11 shows a diagrammatic view of linear generators used in conjunction with the carrying strap of a purse or briefcase.
Figure 12:
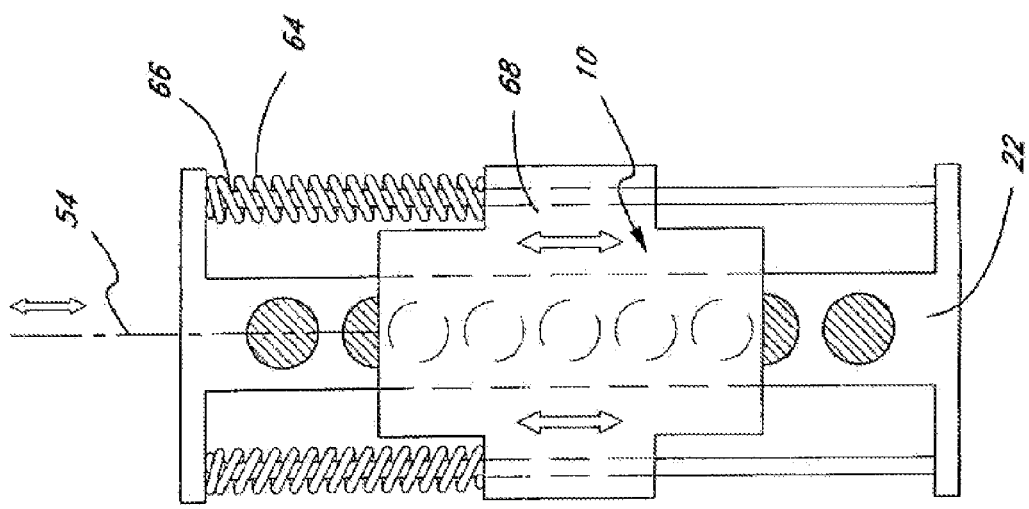
FIG. 12 shows a linear generator with a fixed coil carrier.
Figure 13:
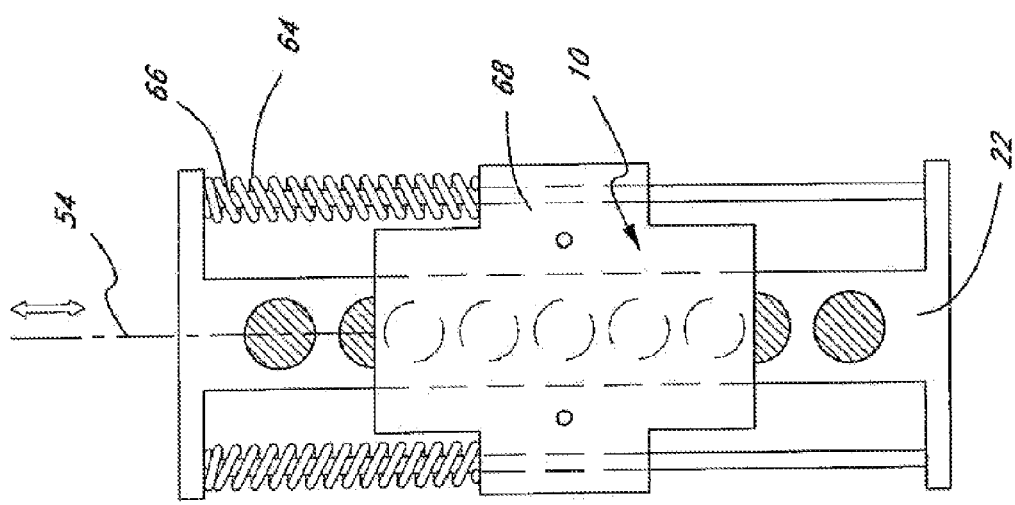
FIG. 13 shows a linear generator with a fixed magnet array assembly.

This can best be understood by reference to FIG. 10 where a pair or linear generators 52 are connected by means of a cable 54 to the handle 56 of a briefcase 58, or FIG. 11 where linear generators 52 form the connection between a briefcase 58 and a carrying strap 62. Of course, the briefcase could be a laptop computer case or a purse or any other similar carried container. In these embodiments either the carrier 22 or the magnet array assembly 10 can be fixed relative to the briefcase 58 while the non-fixed component is free to oscillate vertically relative to the fixed component. Take, for example, FIG. 10 where lifting force applied to the handle 56 pulls the cables 54 and thus applies tension to the non-fixed component. In FIG. 12 the fixed component is the coil carrier 22 which is attached to a frame 66 which is fixed to the side of the briefcase 58. The magnet array assembly 10 is attached to a cable 54 and has wings 68 that ride on the frame 66 in slidingly attached manner. A compression spring 64 prevents the magnet carrier 10 from moving beyond the top of the frame 66 (an extension spring, not shown, could provide a similar effect by being attached between the bottom of the frame 66 and the bottom edge of the carrier 10). As the briefcase is carried by its handle 56, swinging motion is transmitted through the cables 54 causing the magnetic assembly 10 to move up and down relative to the coils 24 in the carrier 22 generating electric power. FIG. 13 is an essentially identical configuration except that the carrier 22 and frame are free to move and the magnet array assembly 10 is fixed to the briefcase 58. In this case the cables 54 are attached to the carrier 22 and the upper spring 64 is an extension spring between the top of the frame 66 and the top of the wing 68 (a lower compression spring—not shown—an also be used between the bottom of the wing 68 and the bottom of the frame 66). These same variations can be applied to the configuration of FIG. 11 or to various types of holsters and holders for cell phones and PDAs, etc. The connection between a user's belt and the holster is made to the upper edge of the device. Thus the weight of the holster and the electronic device pulls the holster down (moving the coils and magnets relative to each other). The strength of the spring function is selected so that the weight of the holster and device therein is not sufficient to move the magnet array or the carrier to the extreme ends of the device. That is, the carrier or magnet array "floats" with the spring tension. As the wearer walks, the magnet array and the carrier will bob up and down relative to each other generating power with the inertial mass of the holster and electronic device being used to provide momentum to overcome back electromotive force.

It will be apparent to one of skill in the art that several simple modifications can be made to these devices. The exact size-spacing of the magnets and gap and the weight of the carrier should be "tuned" to resonate with the repetitive motion used to generate power. A device optimized to charge a cell phone while a user walks would have a different resonant mechanical frequency than a device optimized to generate power from ocean waves. Depending on the expected distance of the reciprocal motion, the number of magnets can be advantageously increased. To maintain the preferred alternating polarities in a magnet array it is preferred, but not essential, so as to have an odd number of magnets in each array so that the end magnets can have identical polarities.

Figure 14:
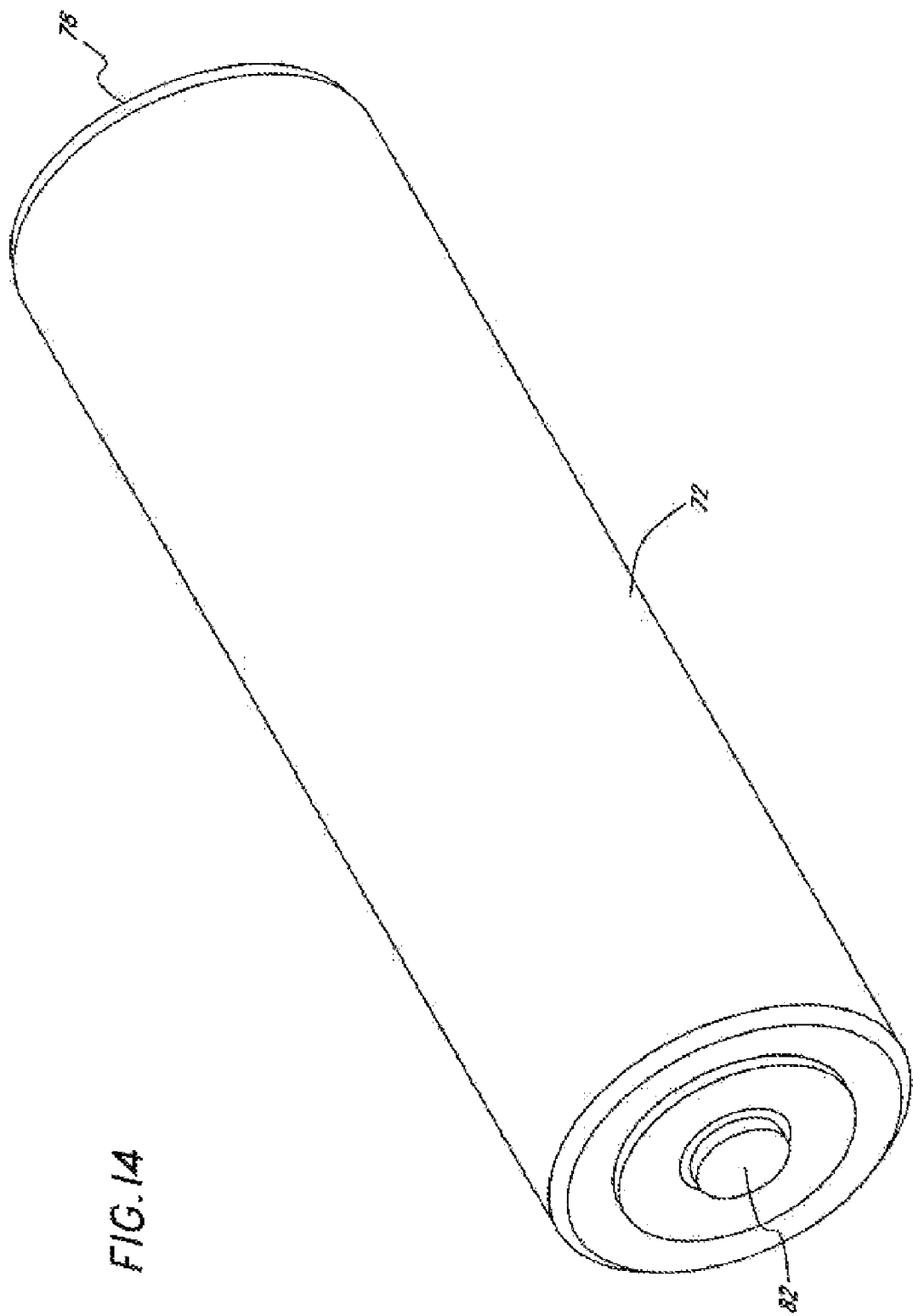
FIG. 14 shows a perspective view of a linear generator intended to replace a pair or conventional batteries (electrochemical cells)

Another use of the high power linear generators of the current invention is for battery replacement as in a flashlight. It is possible to enclose a low friction embodiment (such as the one shown in FIG. 5) within a cylinder shaped and sized to replace a conventional battery. Because many devices such as flashlights use a pair of batteries linearly arranged, a cylinder can advantageously be sized to occupy the space of two batteries. As in the previous example with briefcases and holsters the relative motion of magnet array to coil can be produced by movement of either the magnet array or the coil (actually the carrier containing the coil(s)). As in the previous example the carrier 76 and the magnet array 74 are springingly connected to facilitate power generation in response to shaking or similar motion. Ferrofluid bearing are used to minimize friction as the magnet array moves over the carrier. FIG. 14 shows a cylindrical device 72 sized to replace a pair of conventional "D" size batteries. (The unit can be readily scaled to replace other battery sizes such as a "C" size battery).

Figure 15:
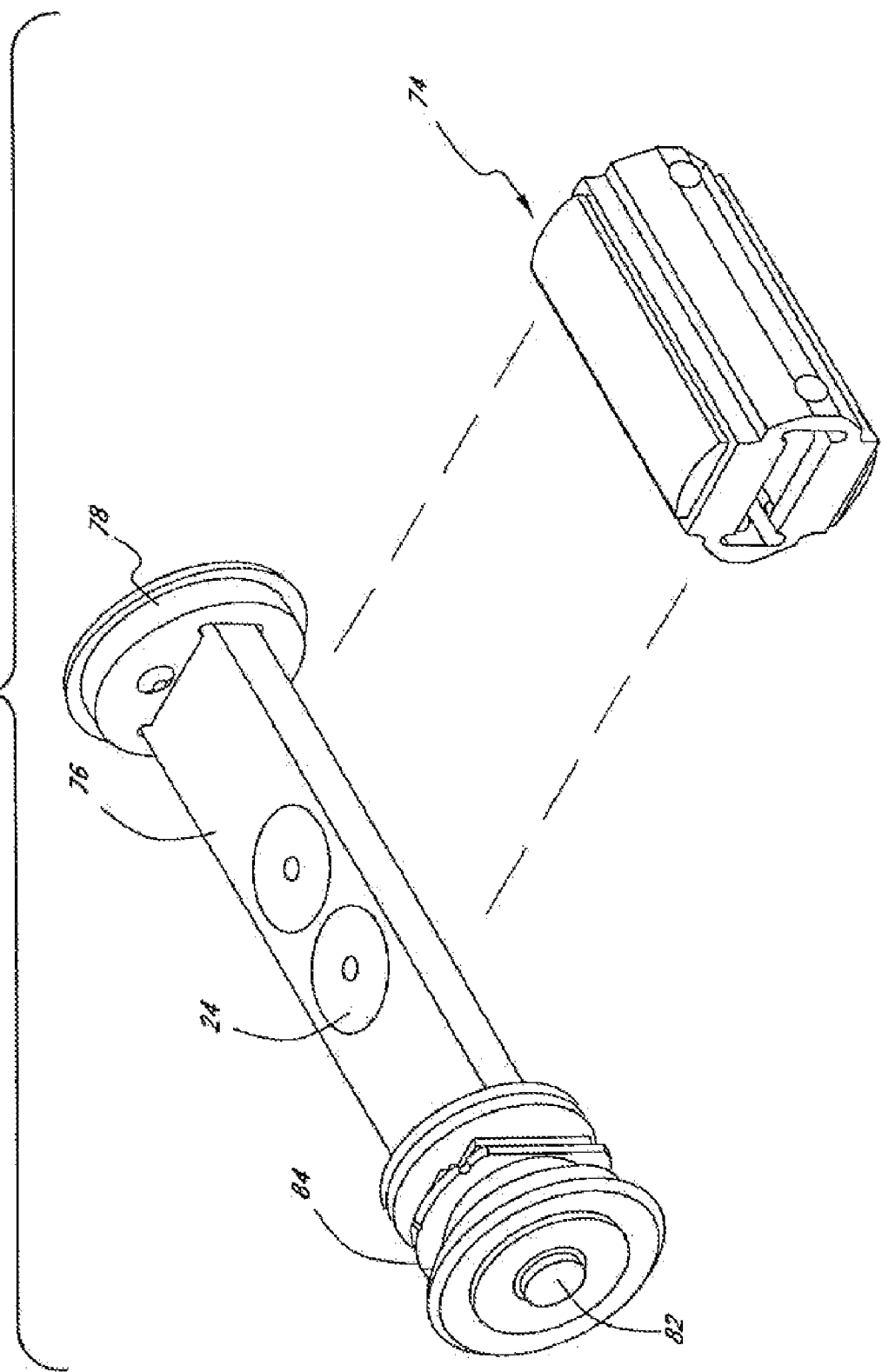
FIG. 15 shows the working components of the device of FIG. 14.

FIG. 15 shows the device with the outer cover removed. Inside a yoked magnet array 74 is designed to move reciprocally over a fixed coil carrier 76. The fixed carrier 76 is attached to negative end cap 78 and positive end cap 82 which act as the terminals for the battery replacement device. An electronics package 84 is sandwiched between the positive end cap 78 and the fixed carrier. The electronic package combines the electrical power from the coils 24 and stores it in a capacitor or a conventional rechargeable cell.

Figure 16:
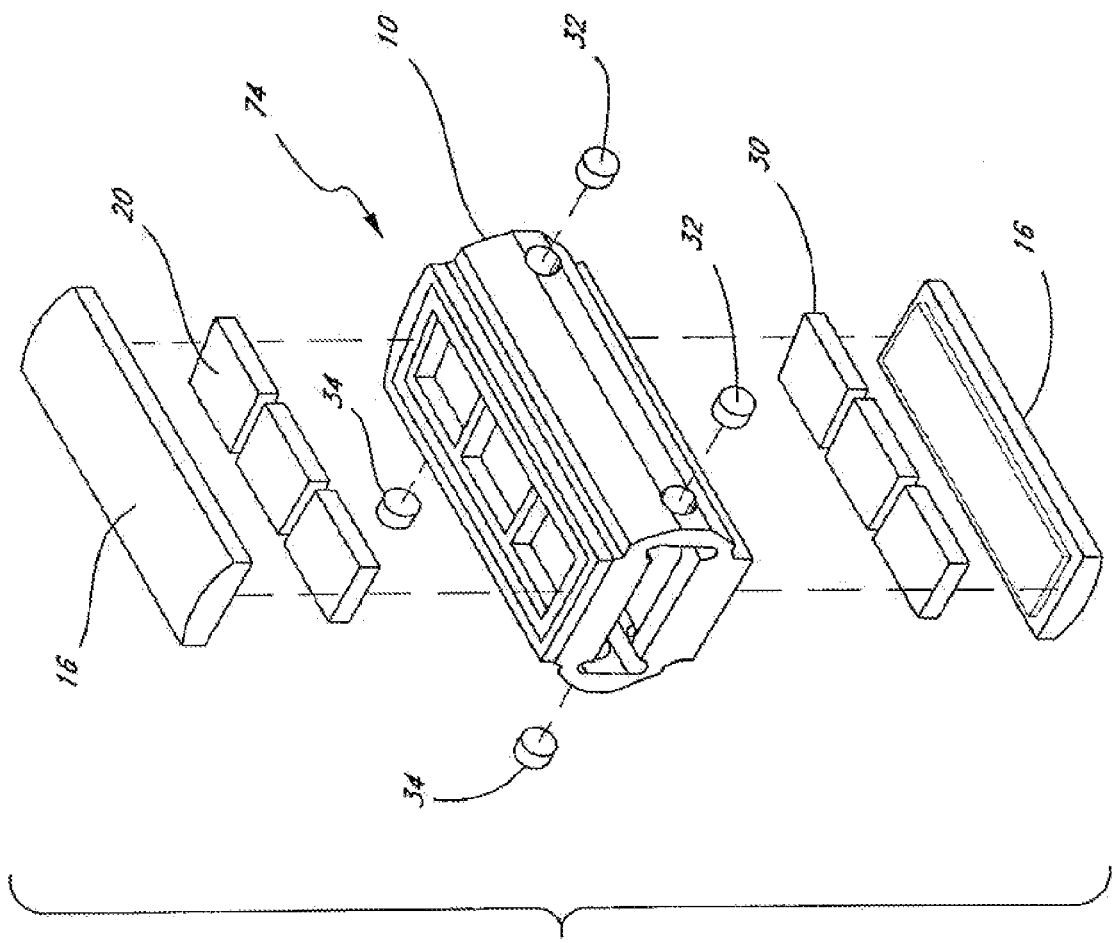
FIG. 16 shows an exploded view of the magnet array of the device of FIG. 14.

FIG. 16 shows an exploded view of the magnet array 76. The structure is virtually identical to that of FIG. 5. Here three pairs of square magnets 20 are inserted into the body of the carrier 76 and covered by yoking sheets of high permeability material 16. Four bearing magnets 32, 34 are inserted into the lateral edges of the carrier 76. Whereas the device of FIG. 5 was designed to have the coil carrier 22 containing the coils 24 move relative to the stationary yoked magnet array 10, here the coil carrier 76 is stationary while the magnet array 74 oscillates back and forth over the coils in response to a shaking motion. As previously explained the ferrofluid and the bearing magnets 34 ensure that such motion is virtually friction-free. However, it is necessary to provide some type of springing or elastic relationship between the fixed coil carrier 76 and the yoked magnet array 76.

Figure 17:
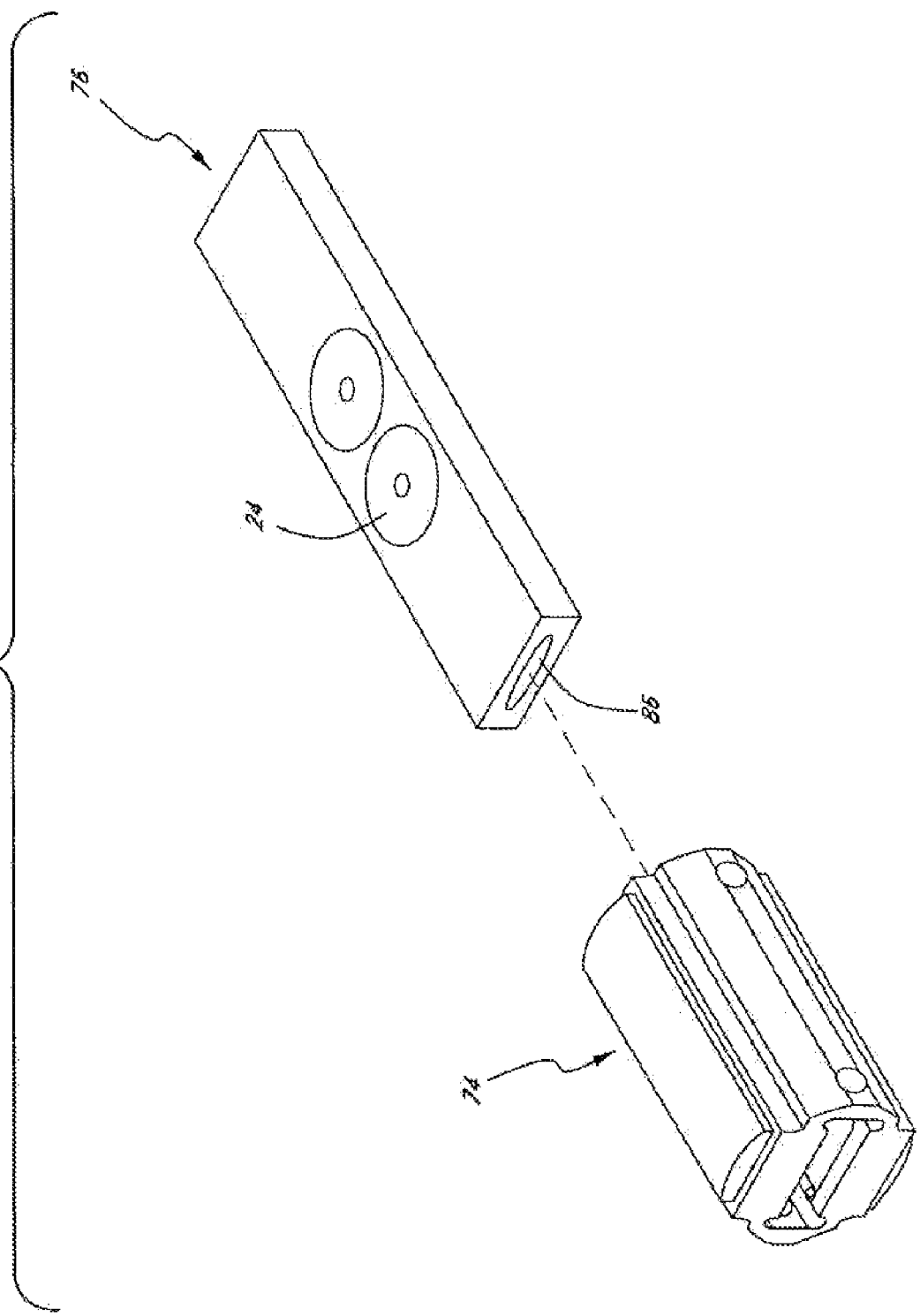
FIG. 17 shows a perspective view of the coil carrier and magnet array of the device of FIG. 14.
Figure 18:
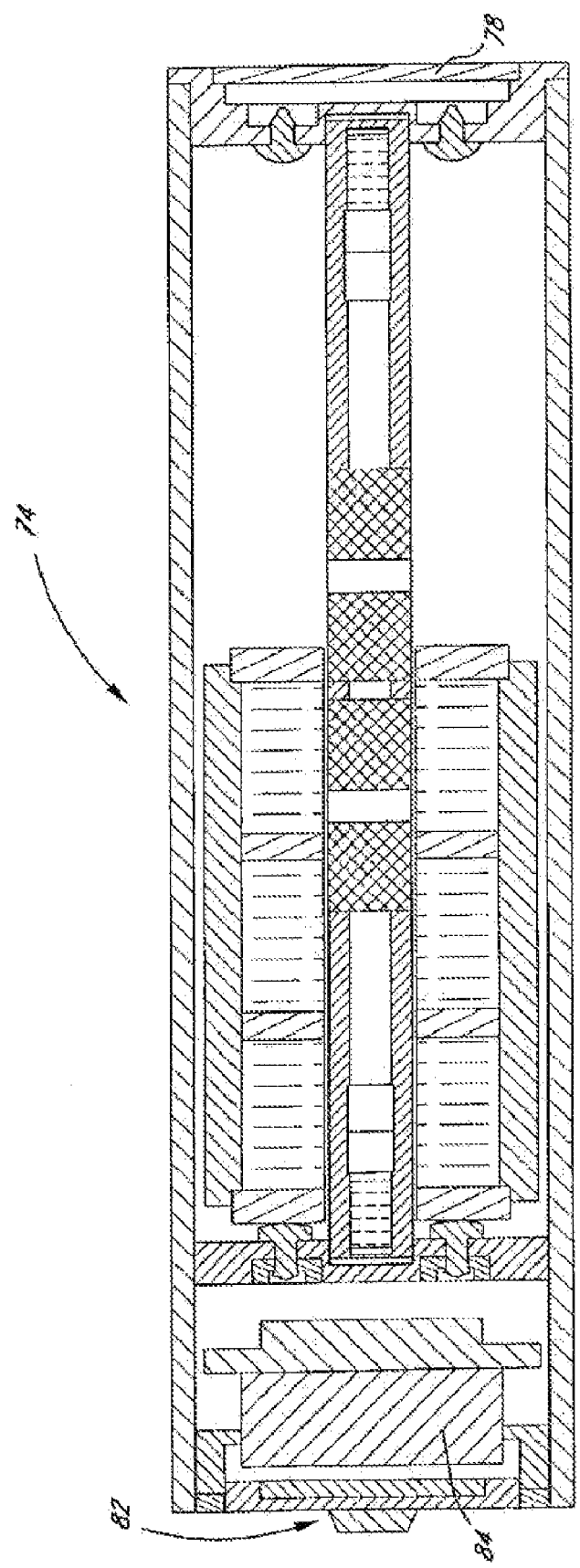
FIG. 18 shows a cross-section of the device of FIG. 14.

FIG. 17 shows the magnet array 74 and the fixed coil carrier 76 with the other components removed. This allows a view of a rebound magnet 86 located in a slot in the end of the fixed carrier 76. There is a rebound magnet 86 at either end of the carrier 76. The purpose of the rebound magnet 86 is to prevent the magnet array 74 from crashing into the end caps 78, 82 of the device wasting kinetic energy. As explained above, the individual paired magnets of the array are arranged so that adjacent magnets 20 have opposite polarities. For example, the leftmost pair of magnets might each have the north poles pointing down. In that case, the middle magnet pair would have its north poles pointing up, and the rightmost magnet pair would have its north poles pointing down. The rebound magnets 86 are located so that as the magnet array approaches either end of the carrier 76, the rebound magnet 86 begin to enter the gap between the end pair of magnets 20. The rebound magnets 86 are oriented so that their polarity is opposite that of the end magnet pair in the array. In the example just given each of the end magnet pairs are oriented with their north poles pointing down. Therefore, the rebound magnets 86 are oriented with their north poles pointing up—that is, in a repulsion configuration relative to the array magnets 20. Because the magnetic flux is extremely strong in the gap between the array magnets, the repulsive forces are also quite strong. As the magnet carrier 74 moves towards either end of the coil carrier, it comes to a halt and reverses direction as soon as one of the rebound magnets 86 begin to enter the gap between one of the magnet pairs. This is most easily seen in FIG. 18 which is a cross-section of the battery replacement device. Note that the rebound magnets 86 are located at the extreme ends of the coil carrier 76. Even if the magnet array reaches the absolute end of the coil carrier 76, the rebound magnet 86 is less than half the length of one of the array magnets 20, 30 into the gap between the array magnets 20, 30. Although in most cases repulsive forces of the rebound magnets cause the magnet carrier to stop and reverse its direction, resilient bumpers 88 are provided to avoid a hard crash if the rebound magnets fail to stop the magnet carrier 74.

Figure 19:
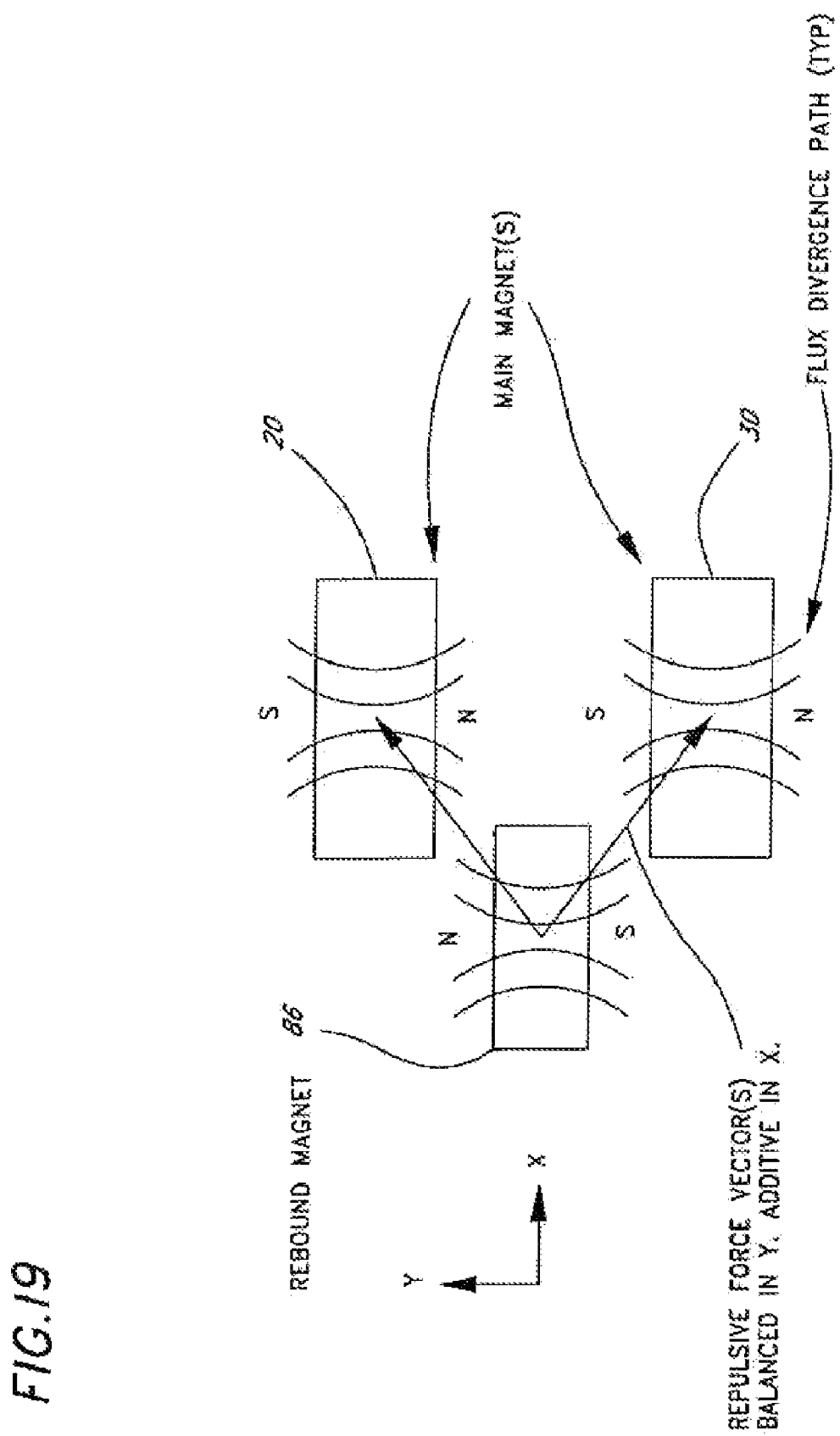
FIG. 19 shows a diagram representing the magnet flux from a rebound magnet resulting in repulsive forces in the device of FIG. 14.

Some prior art devices have used opposing magnets to "suspend" a working magnet and prevent it from reaching the end of travel. In those cases the working magnet is oriented with its magnetic axis parallel to the direction of travel. Similarly, the repelling or suspending magnet must also be oriented with its magnetic axis parallel to the direction of travel. Therefore, the magnetic flux of the magnets necessarily extends along the direction of travel so that as the working magnet approaches the repelling magnet it encounters a gradually increasing flux from that magnet. This causes the moving magnet to decelerate and ultimately "bounce" off the repelling magnet (i.e., change direction). Because the amount of electrical power generated is related to the rate of change of the magnetic flux intersecting the conductor, any prolonged deceleration reduces the efficiency of power generation. In the current invention all of the magnetic axes are oriented normal to the direction of travel. Further, the magnets in the moving array 74 are yoked so that essentially straight flux lines pass from one magnet to another across the gap. Therefore, the magnetic flux from the rebound magnet 86 does not interact with the yoked magnet array 74 until the rebound magnet 86 begins to enter the gap between magnets. Therefore, the repulsion effect is almost instantaneous without the more prolonged deceleration inherent to systems where the magnetic axes are parallel to the direction of travel. This is illustrated diagrammatically in FIG. 19 where the magnetic flux is illustrated as diverging lines parallel to the magnetic axis, and the magnetic repulsion forces are illustrated as typical vector arrows. As the rebound magnet 86 enters the magnetic gap, repulsion forces along the y axis are balance where as the forces along the x axis are unbalance resulting in a significant force to the right which causes the magnet carrier 74 to reverse direction.

Figure 20:
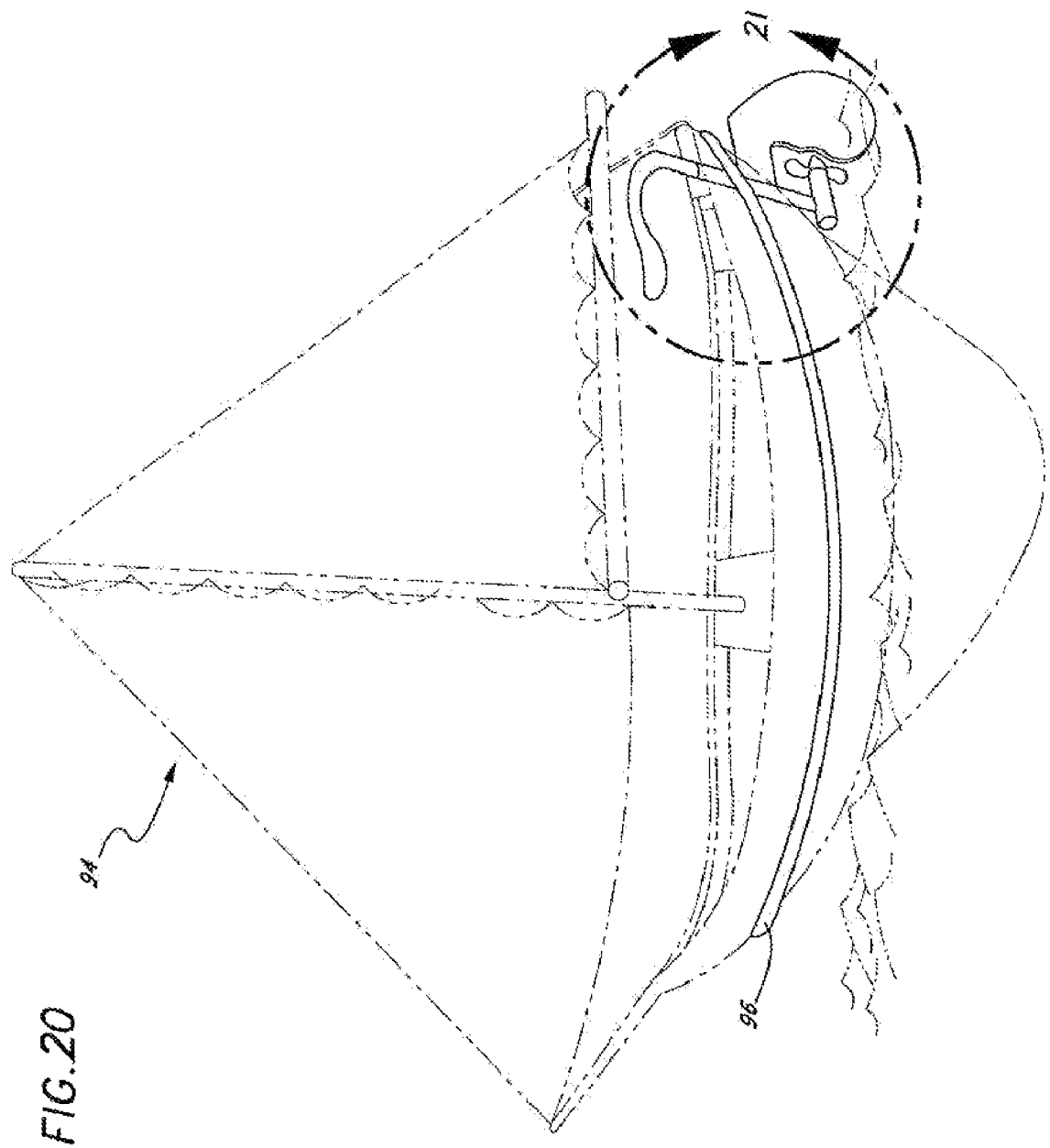
FIG. 20 shows a sail boat equipped with a linear generator.
Figure 21:
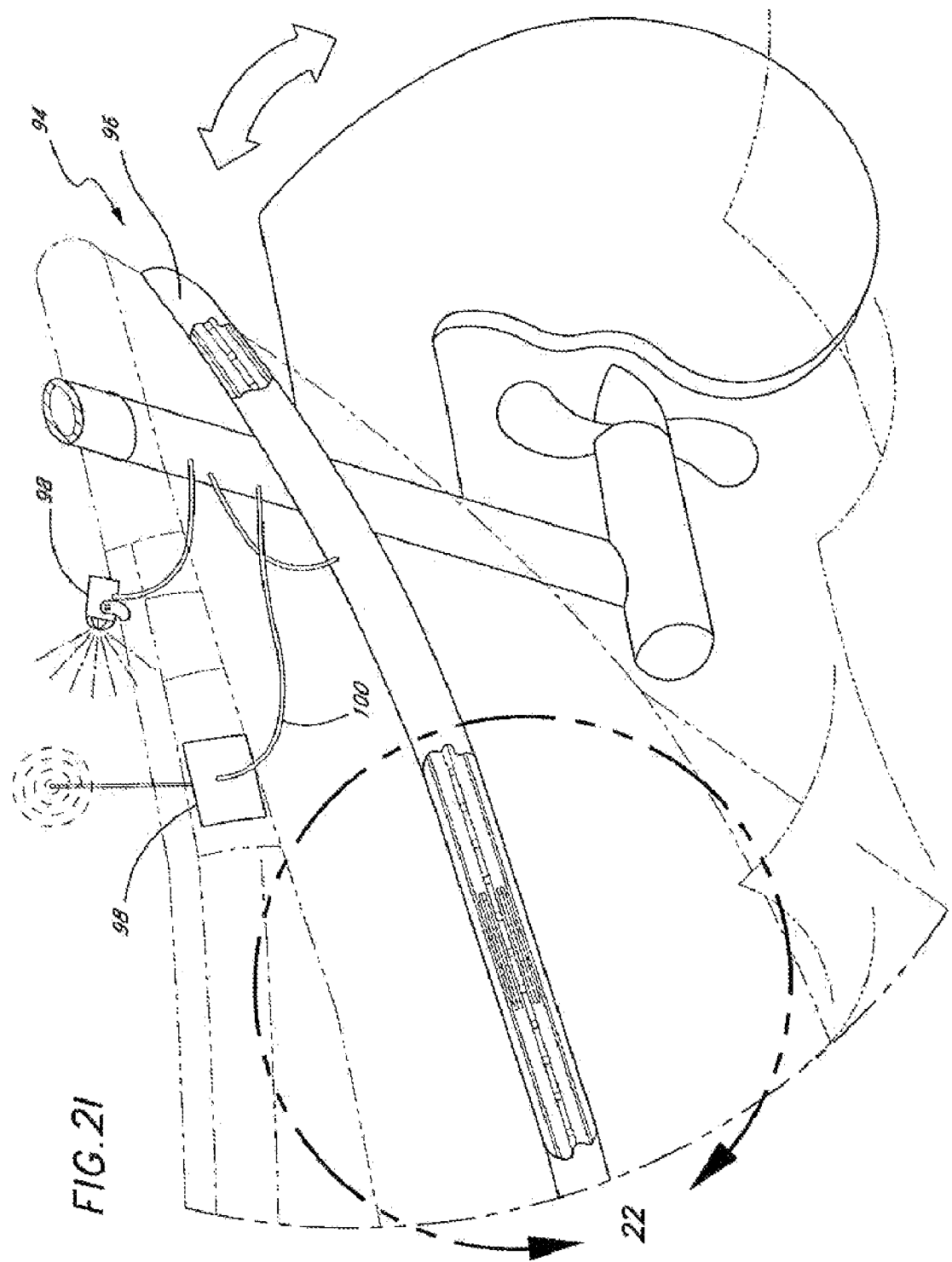
FIG. 21 shows a closer view of the boat of FIG. 20.
Figure 22:
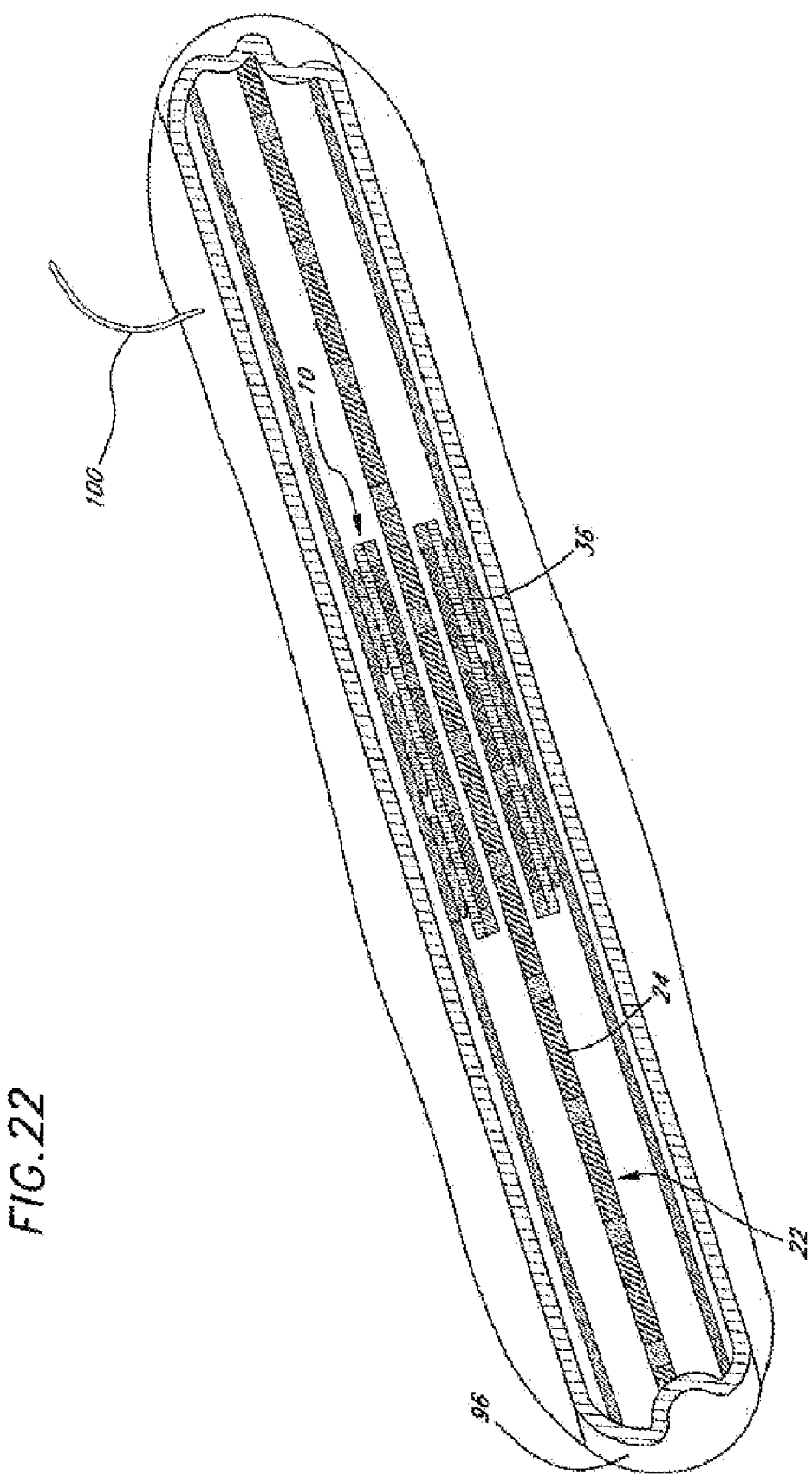
FIG. 22 shows a closer view of the generator of FIG. 20.
Figure 23:
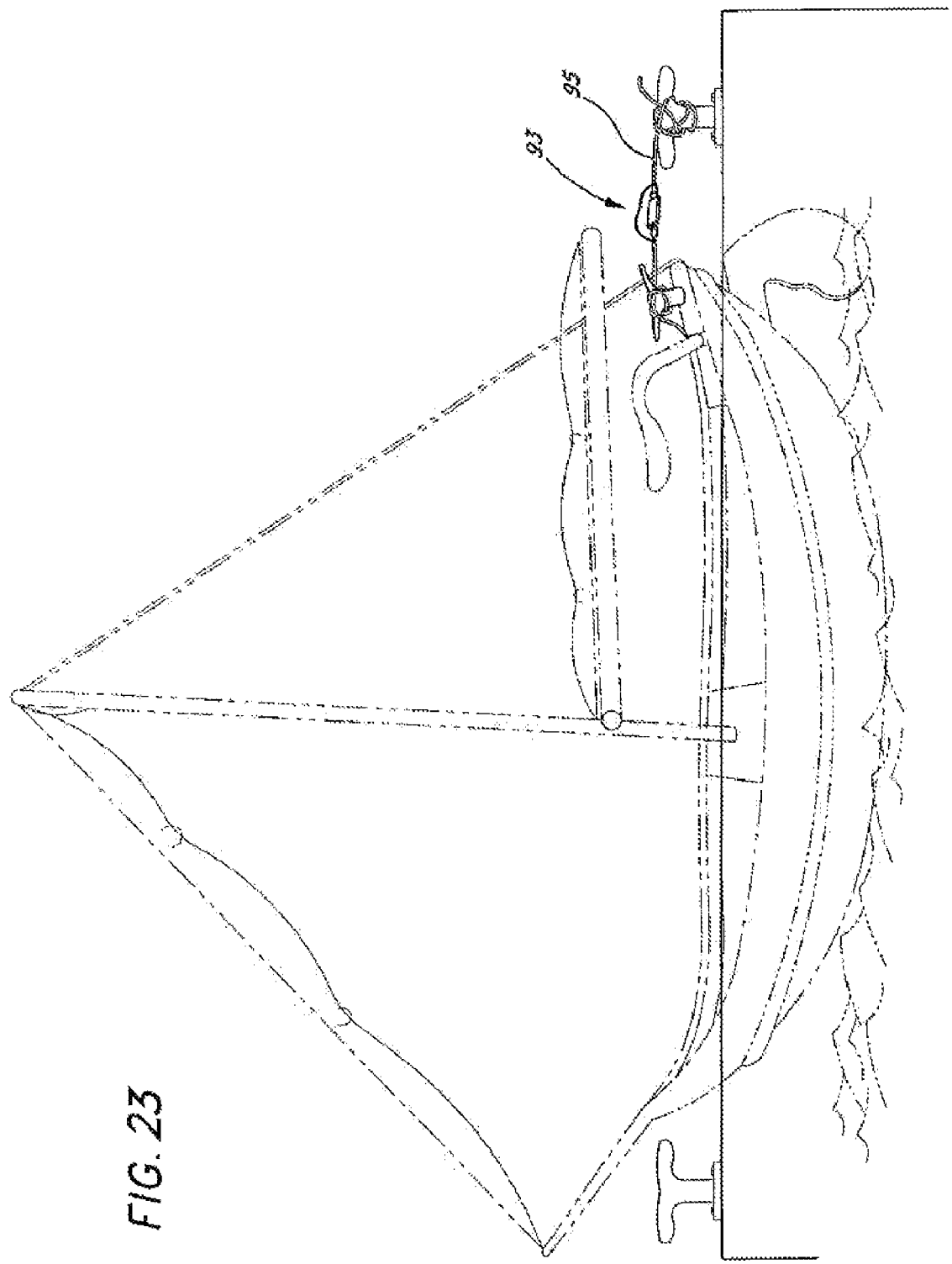
FIG. 23 shows another type of linear generator for use with a boat.

The moving yoked magnet array 76 with low friction bearings is also adaptable to other situations where it is desirable to translate recurring motion. For example, there is significant need to recharge the batteries of a sailing vessel without having to start the emergency engine or a generator. Traditionally, sailing vessels did not have any electrical system. More recently electronic communication and navigational instruments were added for safety purposes. These units run off a battery that can be recharged by solar panels or a generator connected to an engine. With more and more navigation aids such a GPS the battery drain has increased. At night and during a storm it is not possible to rely on solar power and it may be very inconvenient to start up a generator—not to mention the problem where generator fuel becomes scarce. The answer is a linear generator not unlike the one described as a battery replacement. FIG. 20 shows a sail boat 94 with a linear generator strip 96 wrapped along the hull near or slightly below the gunwale. Ideally the linear generator 96 will be slightly curved to match the contours of the hull. If a relative short linear generator 96 is used, it can be straight because over a short distance the curvature of the hull is nominal especially amidships. The linear generator is optimally a sealed tubular structure constructed from a non-corroding material to resist contact with sea water. FIG. 21 shows a closer view of the boat. As shown in FIG. 22, the interior structure of the linear generator 96 is very similar to the battery replacement device of FIG. 14. A coil carrier 76 runs the length of the generator 96 and a moving array 74 of paired magnets slides over the coil carrier 76 aided by ferrofluid bearings 36. Wires 100 lead from the generator to an electrical system including a storage battery (not show). The electrical system powers a number of devices 98. FIG. 23 shows a view of another use of the linear generators of the instant invention with a boat. Here a boat is moored at a dock. Under these circumstances the boat may not rock sufficiently for the generator 96 to function effectively. Here a small generator 93 can be attached to the mooring line 95. The generator is constructed in a manner similar to that shown in FIG. 12 or 13. As the tension on the line 95 increases and decreases, the springingly connected components move back and forth and electricity is generated to maintain battery charge on the boat. This device 95 can also be included as part of a turnbuckle or other fitting used to attach the line to the boat.

Circular Arrays

Figure 24:
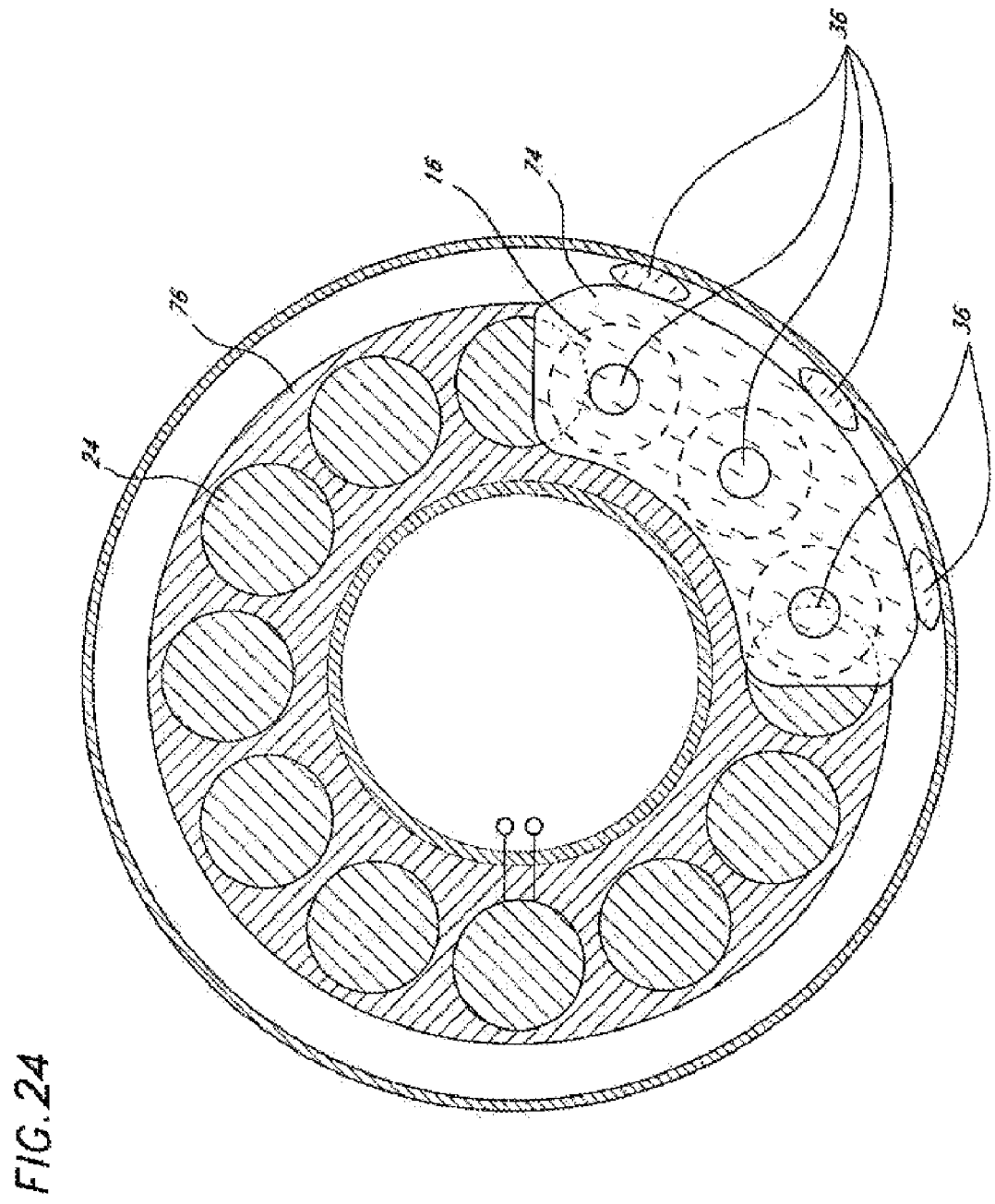
FIG. 24 is a diagram of a circular generator according to the current invention.
Figure 25:
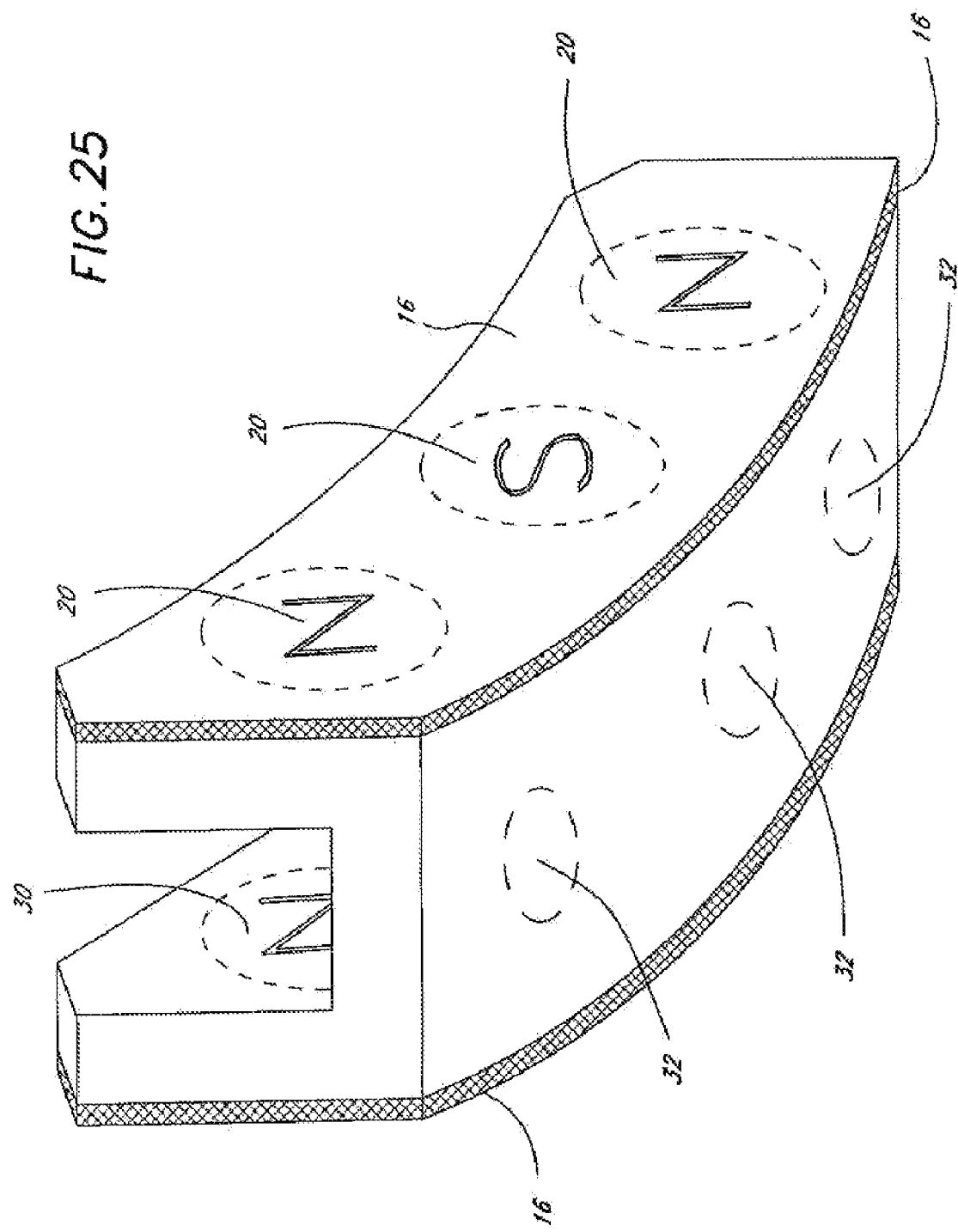
FIG. 25 shows a perspective view of a curved magnet array for use with the circular generator of FIG. 24.

Thus far devices with linear magnet arrays have been described. However, the current invention also lends itself to devices that are curved and/or circular in structure. With a traditional "magnet through the coil" design it can be difficult to configure circular or curved embodiment because those configurations require curved magnets and toroidal coils that may be bulky and difficult to construct. However, the present yoked magnet-gap design can be adapted to almost any shape. The linear generator 96 of FIG. 22 is a good example of a sealed generator with some possible curvature. If the curvature is fairly moderate, only the coil carrier 76 need be curved since the radius of curvature is insignificant over the length of the yoked magnet array 74. FIG. 24, however, is a diagrammatic representation of a truly circular generator. The coil carrier 76 is a circular disc with the coils 24 disposed along radii of the disc. The yoked magnet array 74 is similar to the linear array 74 of FIG. 14 except that it is curved to match the circumference of the coil carrier 76, and as shown in FIG. 25 is open (c-shaped) along one side so as to engage the disc-shaped coil carrier 76 much like a disc break engages its rotor.

Figure 26:
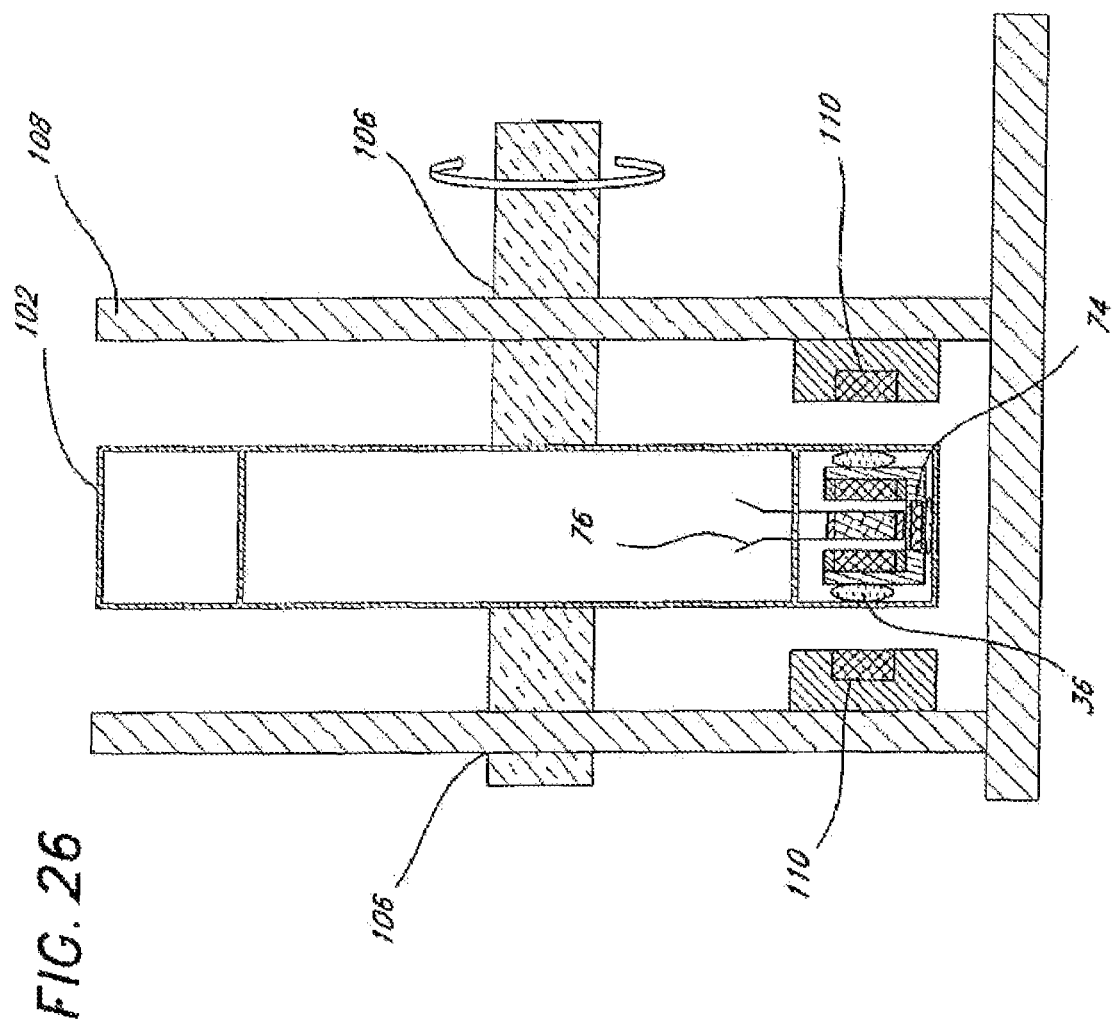
FIG. 26 shows a diagram of a wave activated circular generator.

In one embodiment particularly adapted to supplying electrical power to remote navigation buoys both the coil carrier 76 and the magnet array 74 are sealed inside a wheel-shaped container 102 with the magnet array 74 free to move along the circumference of the coil carrier 76 on ferrofluid bearings 36. FIG. 26 illustrates such a circular ferrofluid bearing generator adapted to generate electricity from wave motion or tides. Here a float and crank mechanism (not shown) is coupled to an axel 104 which is supported in a low friction manner by ceramic bearing attached to a support structure 108. The axel 104 is welded or otherwise connected to the wheel-shaped container 102 (here shown in cross-section) which holds the circular generator. Wave or tide motion causes the float to move in a vertical direction which motion is converted to rotary motion by the crank, thereby turning the axel 104. Because the most likely application is in proximity to sea water, the entire device is made from non-corroding materials. Ceramic bearing 106 are relatively unaffected by sea water, and the magnets and coils are completely sealed inside the container 104. As the wheel-shaped container 104 rotates, the disc shaped coil carrier 76 rotates with it. The wires from each coil 24 run to electronics modules (not shown) in the central area of the container 102. Electricity can be conducted from the container 102 by a commutator device on the axel 104. When the container 102 rotates, the coil carrier 76 moves freely through the magnet array 74 and electricity is generated. Because of the low friction coupling between the magnet array 74 and the container 104, attractive forces between the magnets and the coils 24 might cause the magnet array 74 to move with the coil carrier 74. This tendency is resisted by an opposing magnet pair 110 whose magnetic attraction keeps the magnet array 74 at the bottom of the container 104.

Figure 27:
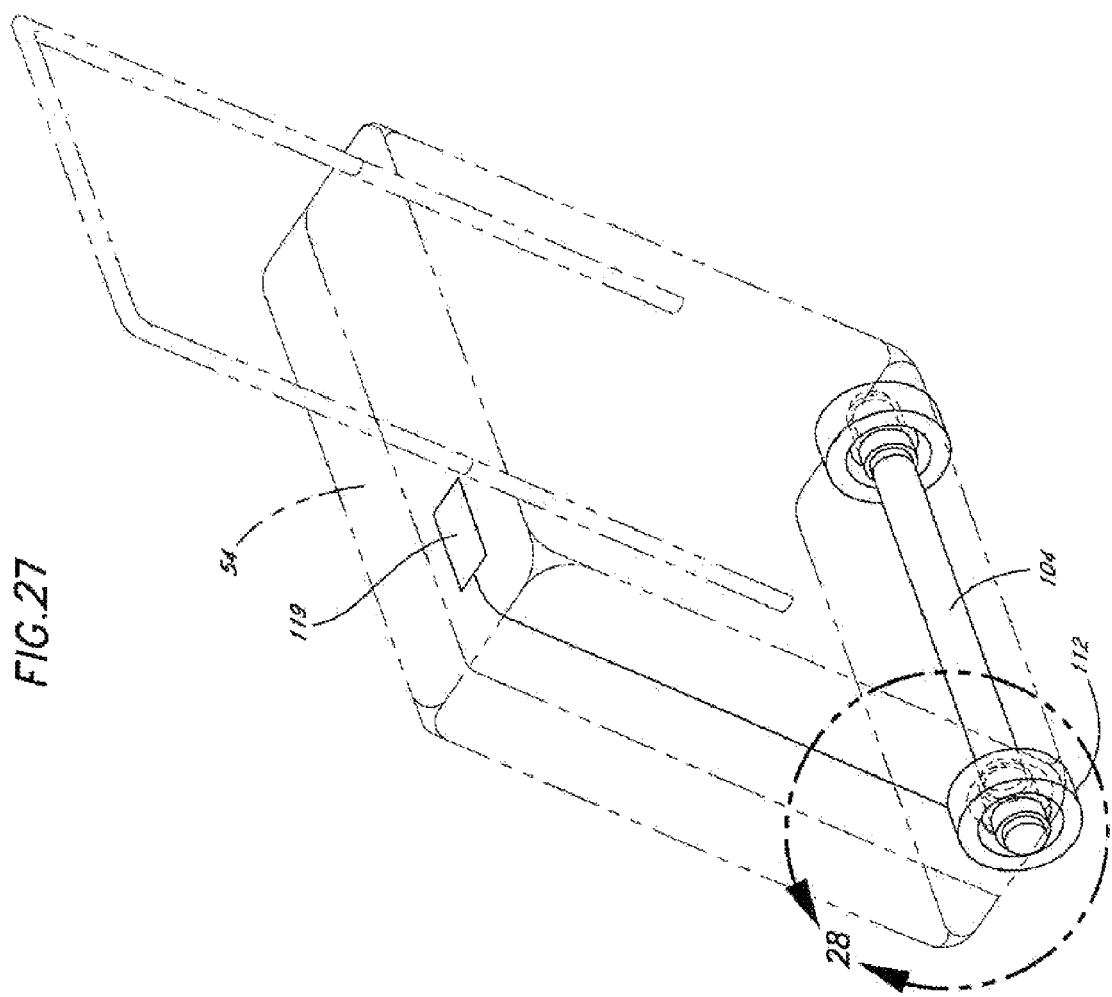
FIG. 27 shows a circular generator on a wheeled cart.
Figure 28:
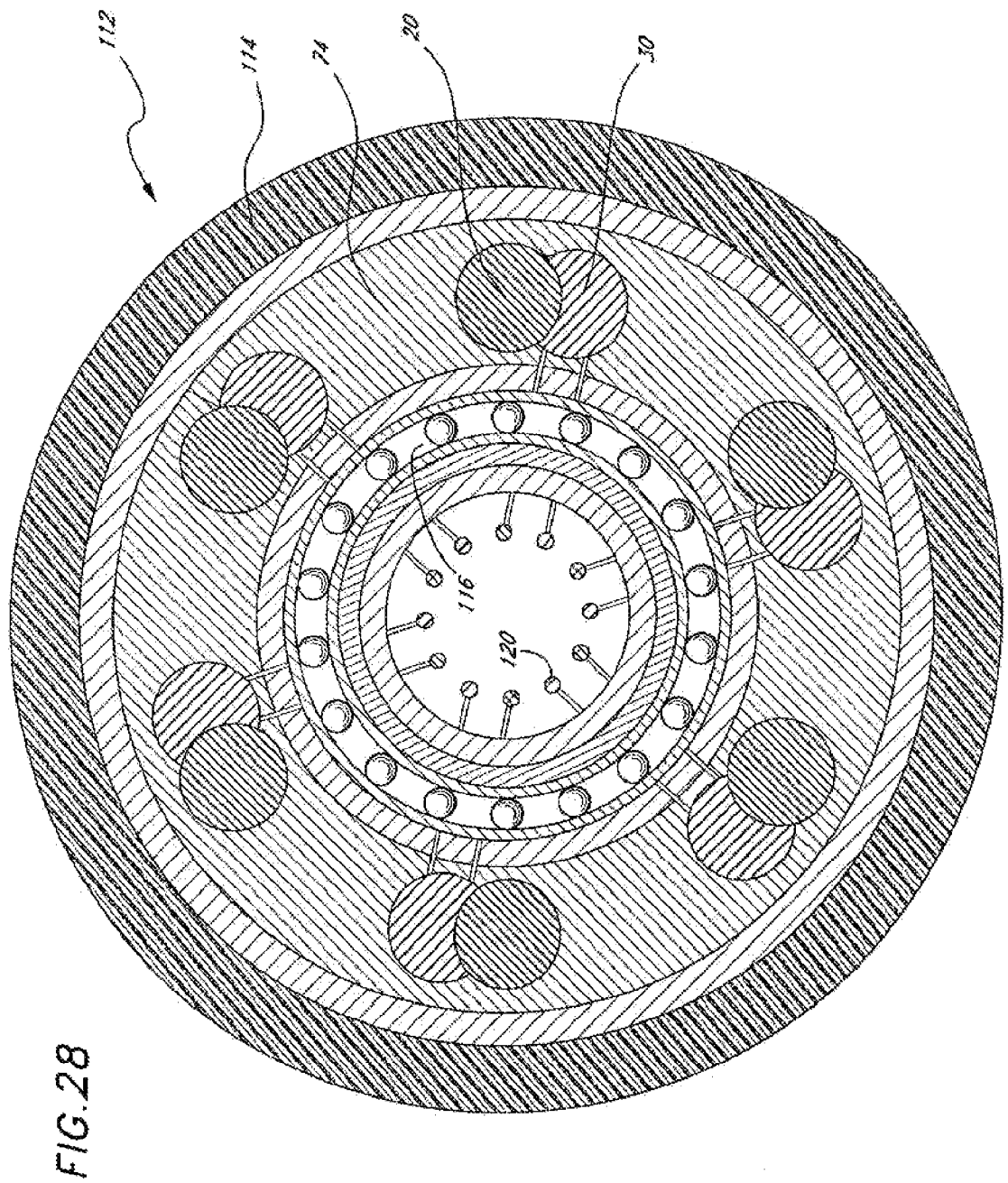
FIG. 28 shows a cross-section through the wheel generator of FIG. 27.

FIG. 27 shows another version of a circular generator which is useful with a wheeled piece of luggage or the like. In this device a suitcase or briefcase 54 has wheels 112 that individually turn on an axel 104. As shown in FIG. 28 a cross-section through the device shows that the wheel 112 (with the tire 114) forms an outer tube that rotates on a race bearing 116. A circular yoked magnet array 74 is attached to the wheel 112 so that when the wheel 112 rotates, the circular magnet array 74 and magnets 20 moves with it. A disc-shaped coil carrier is linked to the non-turning axel 104 so that when the wheel rotates, the magnet array 74 moves relative to the coil carrier and electrical current is generated. Because the coil carrier is stationary, electrical leads 120 from the coils can be routed through the hollow axel 102 to an electronics module where the power from the coils is combined and stored. The case 54 can be conveniently equipped with internal (or external) connectors 119 to power and recharge a plethora of different portable devices. Thus, a busy business traveler can always have his or her electronics charged in spite of a busy travel agenda because the act of wheeling the case to and from the airport and business appointment gathers the energy to recharge the devices.

Magnetic Permeability of Coils

The present invention shows greatly improved efficiency over prior art devices because of the yoked magnet arrays with a magnet gap to receive the conductor (coil) for generation of electricity. The yokes and gap arrangement maximizes the magnetic flux passing through the coil and encourages the flux lines to be straight rather than divergent. The generation of electrical power is proportional to the rate of change of magnetic flux within the conductor. Increasing the strength of the flux and ensuring that the flux lines are as close as possible to being normal to the conductor increases the potential rate of change. Because the magnetic permeability of air is low, the magnetic flux tends to diverge unless the gap is exceedingly small. Because magnetic permeability of the coil material is higher than air, filling the gap between the magnets entirely with coil material leads to a higher magnetic flux in the gap. For example if a standard thickness of coil is placed between the magnets without any air gap, the average field strength within the coil will be about 0.84 kGauss. However, if a 0.1" (2.54 mm) air gap is added above and below the coil, the decrease in magnetic permeability causes the average field strength inside the coil to drop to 0.5 kGauss. If the air gaps are increased to 0.15 inches (3.81 mm) each, the average field density within the coil ranges fro 0.3 to 0.4 kGauss. Clearly, the air gap necessary for movement of the magnet relative to the coil significantly decreases the average magnetic field strength and hence the electrical power generated by the system.

One possible solution is to fill the gap with ferrofluid. Ferrofluid has a magnet permeability of about $10\mu$ which is considerably higher than the $1\mu$ value for air. Further, it is likely that ferrofluid will inadvertently get into the magnet gap when ferrofluid bearing are used elsewhere in the device. The presence of the ferrofluid also guards against friction between the magnet and the coil. A surprising finding is that filling the gap with ferrofluid does not appear to increase magnetic field strength within the coil. In the case of 0.1 inch gaps the ferrofluid gives an average field strength of 0.3 kGauss which is somewhat lower than the air value. With gaps of 0.15 inches the ferrofluid gives an average field strength of about 0.3 kGauss. Interestingly, in each case the field distribution is more even with the ferrofluid than with air in the gaps. It would appear that the improved permeability of the ferrofluid results in a more even field with somewhat more parallel flux lines. The parallel flux lines are favorable while the lower field strength is unfavorable. To some extent these factors may cancel each other so that the overall effect on power generation is negligible.

Another possibility is to somehow increase the magnet permeability of the coil to thereby increase the magnetic field strength therein. Diamagnetic conductors like copper have slightly lower magnetic permeability than air, there is little one can do to make such material more permeable. Of course, it is possible to substitute a paramagnetic conductor (such as aluminum) that has a higher permeability. However, a coil is not solid conductor; rather it is conducting wire with a thin insulating layer wound to form a coil. Besides the insulating coating, there is a considerable volume of air between the turns of the coil. Therefore, the overall magnetic permeability of the coil can be increased by infiltrating the air spaces with material having a higher magnetic permeability. It is also possible to replace the insulating coating with material having increased permeability. Because the varnish coating on magnet wire is so thin, the results of replacing the insulating coating are not nearly as significant as the results of infiltrating the air spaces. Ferrofluid provides an ideal means for achieving such infiltration. It is fairly simple to immerse the coil in a ferrofluid and apply force (for example, mild centrifugation or evacuation) to facilitate infiltration. Once the fluid has evenly penetrated the coil's intricacies the solvent can be evaporated to leave the nano-ferrite particles (approximately 5-10 nm in diameter) behind. If it is desired to orient the particles, it is possible to allow the evaporation to occur within a magnetic field which can be provided by external magnets or by energizing the coil with electricity. For optimum results, the ferrite particles should not be able to move or reorient when the coil is used. This can be achieved by adding a trace of a soluble resin to the ferrofluid so that the nano-ferrite particles are "glued down." It is also possible to make a dense solution of nano-ferrite particles in a polymerizable matrix so that after the coil has been completely infiltrated, the matrix can be polymerized to leave the particles "frozen" in place.

It is fairly simple to add enough nano-ferrite particles to the coil to increase its overall permeability. For example, if the overall permeability of the coil is raised to 10µ, the average magnetic field strength for either 0.1 inch air gaps or 0.15 inch gaps is 0.5 kGauss. In either case the magnetic field are more uniform with more parallel flux lines as compared to coils without nano-ferrite infiltration. It is anticipated that coils with significantly higher magnetic permeability due to infiltration by nano-ferrite can be readily achieved. When the infiltrated coils are combined with ferrofluid filled gaps, the results are even more dramatic. For devices with either 0.1 inch or 0.15 inch gaps the field intensity is 0.82 kGauss, which is almost as high as the no air gap situation. The result is the combination of ferrite infiltrated (that is, higher magnetic permeability) coils with ferrofluid gaps is to essentially eliminate the effects of an air gap. Furthermore, there is little difference between 0.1 inch and 0.15 inch gaps. This means that slight mechanical variations in the device will not have significant influences on overall power generation. When an unoptimized test device was constructed using nano-ferrite infiltrated coils with ferrofluid filling the air gap. This unit produced 40% more power than an identical unit without nano-ferrite particles in the coil.

The following claims are thus to be understood to include what is specifically illustrated and described above, what is conceptually equivalent, what can be obviously substituted and also what essentially incorporates the essential idea of the invention. Those skilled in the art will appreciate that various adaptations and modifications of the just-described preferred embodiment can be configured without departing from the scope of the invention. The illustrated embodiment has been set forth only for the purposes of example and that should not be taken as limiting the invention. Therefore, it is to be understood that, within the scope of the appended claims, the invention may be practiced other than as specifically described herein.

What is claimed is:

1. A dynamic magnet system comprising:
   a support structure to support a first and a second array of magnets, respectively, with a first support surface and a second support surface thereof, wherein each magnet in each array is disposed with a magnetic polarity opposite that of an immediately adjacent magnet in the same array and with a polarity identical to the magnet in the corresponding position in the other array, wherein each magnet has a first end and a second end and each magnet is disposed with magnetic axes substantially normal to the support surfaces and wherein the support structure is formed so that the first array is aligned and juxtaposed with the second array with the ends of the magnets of the first array separated from the corresponding ends of the magnets of the second array by a gap;
   at least one magnetic yoke comprising material with high magnetic permeability disposed to cover and magnetically link only the first ends of the magnets of at least one of the arrays leaving the second ends of the magnets substantially exposed in the gap; and
   a carrier sized and disposed to fit within the gap in proximity to the exposed second ends of the magnets, the carrier carrying a coil so that relative motion between the coil and the magnet ends substantially normal to the magnetic axes induces a flow of electrons within the coil.

2. The dynamic magnet system according to claim 1, wherein the magnetic yokes comprise mu metal.

3. The dynamic magnet system according to claim 1, wherein the coil has been treated to increase the magnetic permeability of the coil.

4. The dynamic magnet system according to claim 3, wherein the magnetic permeability of the coil has been increased by including nano-ferrite particles therein.

5. The dynamic magnet system according to claim 1, wherein the carrier comprises a plurality of coils.

6. The dynamic magnet system according to claim 1, wherein ferrofluid bearings are included to reduce friction.

7. The dynamic magnet system according to claim 1, wherein the magnet arrays are linear.

8. The dynamic magnet system according to claim 7, wherein the support structure is stationary and the carrier moves relative to the support structure.

9. The dynamic magnet system according to claim 8, wherein the support structure and the carrier are reciprocally engaged so that repeating movement of the dynamic magnet system causes oscillation of the carrier relative to the support structure.

10. The dynamic magnet system according to claim 7, wherein the carrier is stationary and the support structure moves relative to the carrier.

11. The dynamic magnet system according to claim 10, wherein the support structure and the carrier are reciprocally engaged so that repeating movement of the dynamic magnet system causes oscillation of the carrier relative to the support structure.

* * * * *